US012627231B2

(12) United States Patent     (10) Patent No.:   US 12,627,231 B2
Tschirhart et al.     (45) Date of Patent:    May 12, 2026

(54) MULTI-PHASE POWER SUPPLY SYSTEM AND CONTROL OF DYNAMIC LOAD

(71) Applicant: Infineon Technologies Austria AG, Villach (AT)

(72) Inventors: Darryl Tschirhart, Newmarket (CA); Danny Clavette, Greene, RI (US); Benjamim Tang, Rancho Palos Verdes, CA (US)

(73) Assignees: Infineon Technologies Austria AG, Villach (AT); Infineon Technologies Canada Inc., Ottawa (CA)

( * ) Notice: Subject to any disclaimer, the term of this patent is extended or adjusted under 35 U.S.C. 154(b) by 0 days.

(21) Appl. No.: 18/227,487

(22) Filed: Jul. 28, 2023

(65) Prior Publication Data

US 2025/0038665 A1    Jan. 30, 2025

(51) Int. Cl.
*H02M 3/158*     (2006.01)
(52) U.S. Cl.
CPC ................................. *H02M 3/158* (2013.01)

(58) Field of Classification Search
CPC ...................................................... H02M 3/00
See application file for complete search history.

(56) References Cited

U.S. PATENT DOCUMENTS

| | | | | |
|---|---|---|---|---|
| 2009/0327786 A1* | 12/2009 | Carroll | .................. | H02M 3/157 |
| | | | | 713/340 |
| 2011/0234183 A1* | 9/2011 | Noon | .................. | H02M 3/1588 |
| | | | | 323/271 |
| 2012/0307528 A1* | 12/2012 | Humphrey | ........ | H02M 3/33592 |
| | | | | 363/17 |
| 2021/0247788 A1* | 8/2021 | Chen | ..................... | H02M 3/158 |

\* cited by examiner

*Primary Examiner* — Rexford N Barnie
*Assistant Examiner* — Joseph N Inge
(74) *Attorney, Agent, or Firm* — Armis IP Law, LLC

(57) ABSTRACT

An apparatus includes a controller. The controller is operative to determine a magnitude of first output current supplied from a first power converter to a dynamic load and determine a magnitude of second output current supplied from a second power converter to power the dynamic load. The controller controls a magnitude of the first output current with respect to a magnitude of the second content output current depending on a magnitude of total output current consumed by the dynamic load.

21 Claims, 27 Drawing Sheets

CURRENT MODE CONTROL

FIG. 5

CURRENT MODE CONTROL

FIG. 6

MULTI-PHASE POWER SUPPLY SYSTEM AND CONTROL OF DYNAMIC LOAD

BACKGROUND

One type of conventional power converter is a buck converter. In general, to maintain an output voltage within a desired range, a controller associated with the buck converter compares the magnitude of a generated output voltage to a setpoint reference voltage. Based on a respective error voltage, the controller modifies a respective switching frequency and/or pulse width modulation associated with activating high side switch circuitry and low side switch circuitry in the buck converter to maintain a magnitude of the output voltage.

In certain instances, the controller controls operation of the buck converter and generation of the output voltage based on an amount of output current supplied by a generated output voltage to a load. For example, conventional techniques include receiving a so-called VID (Voltage Identification) from a load such as a processor being powered by the output voltage. The VID indicates a setpoint voltage in which to produce the output voltage to power the load. The magnitude of the VID setting (such as setpoint reference voltage) may vary depending on a magnitude of the output current. In a manner as previously discussed, the controller of the power supply can be configured to regulate a magnitude of the output voltage supplied to the load based on a target setpoint voltage derived from the received VID value.

BRIEF DESCRIPTION

Implementation of clean energy (or green technology) is very important to reduce our impact as humans on the environment. In general, clean energy includes any evolving methods and materials to reduce an overall toxicity to the environment as caused by energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, etc. Regardless of whether energy is received from green energy sources or non-green energy sources, it is desirable to make most efficient use of raw energy provided by such systems to reduce our impact on the environment. This disclosure contributes to reducing our carbon footprint (and green energy) via more efficient energy conversion.

This disclosure further includes the observation that an important aspect of designing a power system is to consider provide optimal delivery of power via control of multiple power converter phases.

More specifically, a controller as discussed herein is operative to: determine a magnitude of first output current supplied from a first power converter to a dynamic load; determine a magnitude of second output current supplied from a second power converter to power the dynamic load; and control a magnitude of the first output current with respect to a magnitude of the second content output current depending on a magnitude of total output current consumed by the dynamic load.

Via the first power converter, the controller regulates a magnitude of an output voltage of the first power converter with respect to a setpoint reference voltage. The output voltage supplies the first output current to the dynamic load.

In accordance with further examples, the total output current is equal to the magnitude of the first output current plus the magnitude of the second output current.

Yet further, the controller as discussed herein can be configured to, over time, vary a ratio of the magnitude of the second output current with respect to the magnitude of any measured signal such as the first output current or vice versa in accordance with a control function depending on the total magnitude of output current consumed by the dynamic load.

In still further examples, the controller can be configured to receive a first signal indicating a magnitude of first output current and receive a second signal indicating the magnitude of the second output current. The controller or other suitable entity sums the first signal and the second signal to produce a third signal indicative of the magnitude of total output current consumed by the dynamic load. The controller or other suitable entity then multiplies the third signal by a gain value, K, to produce an output current control signal supplied to the second power converter to control the magnitude of the second output current. The controller can be configured to select the magnitude of the gain value, K, depending on which of multiple output current ranges the magnitude of the total output current resides. The magnitude of the gain value K may be a function of a magnitude of the third signal.

In yet further examples, the controller is further operative to control output of a control signal to the second power converter; the control signal indicates an output current control setting in which to produce the second output current. The controller can be configured to determine the magnitude of the second output current supplied from the second power converter via emulation; the emulation may be based on the output current control setting. The emulation of determining the magnitude of the second output current may further include application of a scale factor to the output current control setting.

Still further, the controller as discussed herein can be configured to, via a clamp function in a control loop associated with the first power converter, limit a magnitude of the first output current supplied from the first power converter to the load.

In accordance with yet further examples, the controller can be configured to increase a ratio of the magnitude of the second output current with respect to the magnitude of the first output current for larger magnitudes of the total output current consumed by the dynamic load. Conversely, the controller can be configured to decrease the ratio of the magnitude of the second output current with respect to the magnitude of the first output current for smaller magnitudes of the total output current consumed by the dynamic load.

The controller(s) as discussed herein can be configured to further include any number of control functions such as a first control function, a second control function, and a third control function. Note that the total number of control functions may exceed 3. The first control function can be configured to: i) regulate a magnitude of an output voltage supplied to the dynamic load, and ii) produce a first control signal indicating a first magnitude of supplemental output current to supply to the dynamic load. The second control function can be configured to: i) receive the first control signal, ii) via the second power converter, produce the magnitude of the second output current to be a first portion of the supplemental output current as indicated by the first control signal, and iii) produce a second control signal indicating a second portion of the supplemental output current to supply to the dynamic load. The third control function can be configured to: i) receive the second control signal, ii) via a third power converter, produce a magnitude of a third output current to be equal to the second portion of the supplemental output current as indicated by the second control signal.

Yet further, the first control function can be configured to: i) regulate a magnitude of an output voltage supplied to the dynamic load, ii) produce a first control signal indicating a first magnitude of supplemental output current to supply to the dynamic load, iii) produce a second control signal indicating a second magnitude of supplemental output current to supply to the dynamic load. The second control function can be configured to: i) receive the first control signal, ii) via the second power converter, produce the magnitude of the second output current to be equal to the first magnitude of the supplemental output current as indicated by the first control signal. The third control function can be configured to: i) receive the second control signal, ii) produce a magnitude of third output current from a third power converter to be equal to the second magnitude of supplemental output current as indicated by the second control signal. Note that the total number of control functions may exceed 3.

Further examples herein include the first power converter supplying the first output current to an integrated voltage regulator associated with or in a circuit including the dynamic load. The integrated voltage regulator can be configured to convert the first output current into third output current supplied to a core portion of the dynamic load. The second power converter can be configured to supply the second output current to the core of the dynamic load.

In accordance with still further examples, a method as discussed herein includes: determining a magnitude of first output current supplied from a first power converter to a dynamic load; determining a magnitude of second output current supplied from a second power converter to power the dynamic load; and controlling a magnitude of the first output current with respect to a magnitude of the second content output current depending on a magnitude of total output current consumed by the dynamic load.

Further, the method may include: regulating a magnitude of an output voltage of the first power converter with respect to a setpoint reference voltage, the output voltage supplying the first output current to the dynamic load. The total output current can be equal to the magnitude of the first output current plus the magnitude of the second output current.

Yet further, the method as discussed herein may include: over time, varying a ratio of the magnitude of the second output current with respect to the magnitude of the first output current depending on the total magnitude of output current.

Techniques herein are useful over conventional techniques. For example, the second power converter as discussed herein can be configured to supply different magnitudes of current to the dynamic load, reducing a need for the first power converter to supply the current.

These and other more specific examples are disclosed in more detail below.

Note that although examples as discussed herein are applicable to power converters, the concepts disclosed herein may be advantageously applied to any other suitable topologies as well as general power supply control applications.

Note that any of the resources as discussed herein can include one or more computerized devices, controller, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different examples as described herein.

Yet other examples herein include software programs to perform the steps and operations summarized above and disclosed in detail below. One such example comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, examples herein are directed to methods, systems, computer program products, etc., that support operations as discussed herein.

One example herein includes a computer readable storage medium and/or system having instructions stored thereon. The instructions, when executed by computer processor hardware, cause the computer processor hardware (such as one or more co-located or disparately located processor devices) to: determine a magnitude of first output current supplied from a first power converter to a dynamic load; determine a magnitude of second output current supplied from a second power converter to power the dynamic load; and control a magnitude of the first output current with respect to a magnitude of the second content output current depending on a magnitude of total output current consumed by the dynamic load.

The ordering of the steps above has been added for clarity sake. Note that any of the processing operations as discussed herein can be performed in any suitable order.

Other examples of the present disclosure include software programs and/or respective hardware to perform any of the method example steps and operations summarized above and disclosed in detail below.

It is to be understood that the system, method, apparatus, instructions on computer readable storage media, etc., as discussed herein also can be implemented strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing one or more power converters to deliver current to a load. However, it should be noted that examples herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be implemented and viewed in many different ways.

Also, note that this preliminary discussion of examples herein (BRIEF DESCRIPTION OF EXAMPLES) purposefully does not specify every example and/or incrementally novel aspect of the present disclosure or claimed invention(s). Instead, this brief description only presents general examples and corresponding points of novelty over conventional techniques. For additional details and/or possible perspectives (permutations) of the invention(s), the reader is directed to the Detailed Description section (which is a summary of examples) and corresponding figures of the present disclosure as further discussed below.

BRIEF DESCRIPTION OF THE DRAWINGS

FIG. 5 is an example diagram illustrating implementation of a second control loop using current mode control as discussed herein.

FIG. 6 is an example diagram illustrating implementation of a second control loop using current mode control as discussed herein.

Figure 1:
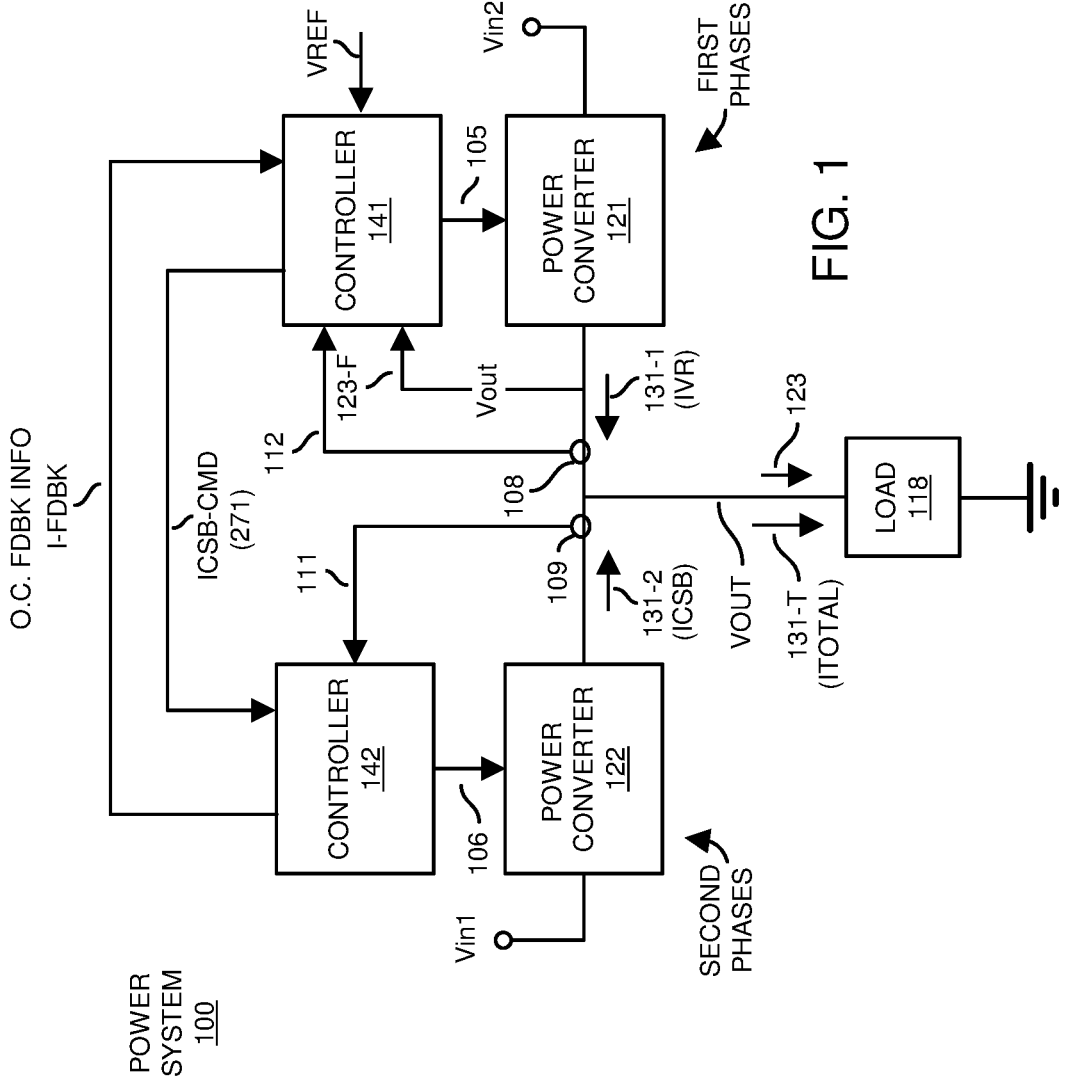
FIG. 1 is an example general diagram of a power supply including a primary power converter (such as including first power converter phases) and a secondary power converter (such as including second power converter phases) as discussed herein.

The foregoing and other objects, features, and advantages of the invention will be apparent from the following more particular description of preferred examples herein, as illustrated in the accompanying drawings in which like reference characters refer to the same parts throughout the different views. The drawings are not necessarily to scale, with emphasis instead being placed upon illustrating the examples, principles, concepts, etc.

DETAILED DESCRIPTION

In general, examples herein include a controller operative to receive first input indicating a magnitude of first output current supplied from a first power converter to a dynamic load. The controller receives second input indicating a magnitude of second output current supplied from a second power converter to power the dynamic load. The controller controls a magnitude of the first output current with respect to a magnitude of the second content output current depending on a magnitude of total output current consumed by the dynamic load.

Now, more specifically, FIG. 1 is an example general diagram of a power supply including a primary power converter (such as one or more power converter phases) and a secondary power converter (such as one or more power converter phases) illustrating output current apportionment as discussed herein.

As shown, power system 100 includes controller 141, controller 142, power converter 121, and power converter 122.

Note that the resources in power supply 100 can be implemented in any suitable manner. For example, the resources in power supply 100 can be implemented as hardware, software, or a combination of hardware and software. In one example, the controller 141 can be implemented as controller hardware, controller software, or a combination of controller hardware and controller software; controller 142 can be implemented as controller hardware, controller software, or a combination of controller hardware and controller software; and so on.

As further shown, power converter 121 receives input voltage Vin2; power converter 122 receives input voltage Vin1. The power converters can be configured to receive the input voltages from the same or different sources.

The magnitude of the input voltages Vin1 and Vin2 can be any suitable values. For example, a common voltage source (such as battery, wall power, etc.) can be configured to provide input voltages Vin1 and Vin2 in which a magnitude of the input voltage Vin1 equals a magnitude of the input voltage Vin2. Alternatively, the input voltages Vin1 and Vin2 are supplied by different sources. In one example, the magnitude of the input voltage Vin1 is different than a magnitude of the input voltage Vin2.

In one nonlimiting example, the input voltage Vin1 is 12 VDC; in another example, the input voltage Vin1 is 6-12 VDC derived from an open-loop step-down of 48V; Vin1 could be 12V or 6-12V derived from an open-loop step-down of 48V; Vin2 could be a lower voltage 1.5V-6V derived from Vin1; and so on.

In further examples, the output voltage is a DC voltage.

In yet further examples, the input voltage Vin1 is 48V (nominal) and the power converter 122 provides direct conversion to an appropriate voltage required by the dynamic load 118.

Additional examples herein include generating one or more of the input voltages via half-bridge converters. Other configurations include any transformer-based topology, including resonant converters, can be used with any rectifier structure.

In one example, the input voltage Vin2 is 6-12V derived from open-loop or closed-loop step-down of 48V. Such an architecture saves a conversion stage for major power processing to reduce conduction loss and stress on the 48V/8V converter In general, during operation, the controller 141 provides voltage regulation with respect to producing the output voltage 123 to power the dynamic load 118. For example, the controller 141 receives the setpoint reference voltage signal VREF. Note that the magnitude of the setpoint reference voltage signal VREF may vary depending on operating conditions. Thus, the controller 141 and first power converter 121 can be configured to regulate a magnitude of an output voltage 123 of the first power converter 121 with respect to a setpoint reference voltage VREF. The output voltage 123 and corresponding power converter 121 supplies the first output current 131-1 to the dynamic load 118.

To provide regulation, the power converter 121 further receives output voltage feedback signal 123-F (such as the output voltage 123 itself or a resistor divided voltage value) and compares it to the reference setpoint voltage VREF. The controller 141 produces the control signals 105 supplied to the power converter 121 such that output voltage 123 produced by the power converter 121 is substantially equal to the setpoint reference voltage VREF. Via the output voltage 123, the power converter 121 supplies output current 131-1 to the load 118.

As further shown, the controller 141 monitors a magnitude of the output current 131-1 supplied to the dynamic load 118 via feedback 112 received from the monitor 108. In other words, the feedback 112 indicates a magnitude of the output current 131-1.

The magnitude of the output current 131-1 can be determined in any suitable manner. For example, the magnitude of the output current 131-1 can be physically measured via the monitor 108.

Additionally, or alternatively, as further discussed herein, note that the magnitude of the output current 131-1 can be determined in whole or in part via emulation implemented by the controller or other suitable resource.

As further shown, the controller 142 can be configured to monitor a magnitude of the output current 131-2 supplied to the dynamic load 118 via feedback 111 received from the monitor 109. In other words, the feedback 111 from monitor 109 indicates a magnitude of the output current 131-2.

The magnitude of the output current 131-2 can be determined in any suitable manner. For example, the magnitude of the output current 131-2 can be physically measured via the monitor 109.

Additionally, or alternatively, note that the magnitude of the output current 131-2 can be determined in whole or in part via emulation implemented by the controller or other suitable resource.

As previously discussed, in one example, the power converter 121 regulates the output voltage 123 with respect to a desired setpoint reference voltage VREF.

As further discussed herein, the controller 141 can be configured to control an apportionment of total output current supplied by the power converter 121 and the power converter 122 to the load 118. For example, the controller 141 produces the control signals 105 to control a respective magnitude of the output current 131-1 supplied by the power converter 120 to the dynamic load 118. Additionally, to maintain the output voltage 123 within regulation based on the reference voltage VREF, the controller 141 generates a respective output current command ICSB-CMD (a.k.a., control signal 271) indicating a respective magnitude of output current 131-2 to be supplied by the power converter 122 to the load 118. The controller 142 controls the power converter 122 to supply the magnitude of current as specified by the command ICSB-CMD.

As previously discussed, the controller 142 monitors a magnitude of the output current 131-2 via feedback 111 received from the monitor 109. The controller 142 produces the respective control signals 106 controlling operation of power converter 122 to maintain the magnitude of the output current 131-2 as indicated by the received output current command ICSB-CMD. For example, via a current control loop, if the magnitude of the output current 131-2 is greater than the setpoint magnitude of output current as specified by the command ICSB-CMD, the controller 142 generates the respective control signals 106 to decrease the magnitude of the output current 131-2. Conversely, if the magnitude of the output current 131-2 is less than the setpoint magnitude of output current as specified by the command ICSB-CMD, the controller 142 generates the respective control signals 106 to increase the magnitude of the output current 131-2.

As further shown, the controller 142 provides feedback I-FDBK indicating a respective magnitude of the output current 131-2 supplied by the power converter 122 to the load 118.

As further discussed herein, the controller 141 can be configured to vary a magnitude ratio of output current supplied by each of the corresponding power converter 121 and power converter 122 depending upon total output current 131-T supplied by the output voltage 123 to the load 118. The total output current 131-T in this example is equal to the summation of the output current 131-1 and the output current 131-2.

In this example, the controller 141 determines the magnitude of the output current 131-1 supplied from the first power converter to the dynamic load via the feedback 112 supplied by the monitor 108. The controller 141 determines a magnitude of the output current 131-2 supplied from the second power converter 122 to power the dynamic load via the feedback I-FDBK. The controller 141 controls a magnitude of the second output current 131-2 with respect to a magnitude of the first output current 131-1 depending on a magnitude of total output current 131-T consumed by the dynamic load 118.

As an example, if the dynamic load 118 consumes 100 Amps, the controller 141 can be configured to control the power converter 121 to provide 95 Amps and generate control signal ICSB-CMD to the controller 142 to control the power converter 122 to produce 5 Amps. In such an instance, the power converter 121 provides 95% of the total output current 131-T and the power converter 122 provides 5% of the total output current 131-T.

As another example, if the dynamic load 118 consumes 300 Amps, the controller 141 can be configured to control the power converter 121 to provide 150 Amps and generate control signal ICSB-CMD to the controller 142 to control the power converter 122 to produce 150 Amps. In such an instance, the power converter 121 provides 50% of the total output current 131-T (150 Amps) and the power converter 122 provides 50% of the total output current 131-T.

As another example, if the dynamic load 118 consumes 600 Amps, the controller 141 can be configured to control the power converter 121 to provide 150 Amps and generate control signal ICSB-CMD to the controller 142 to control the power converter 122 to produce 450 Amps. In such an instance, the power converter 121 provides 25% of the total output current 131-T and the power converter 122 provides 75% of the total output current 131-T.

As further discussed herein, any desirable apportionment is possible.

Figure 2:
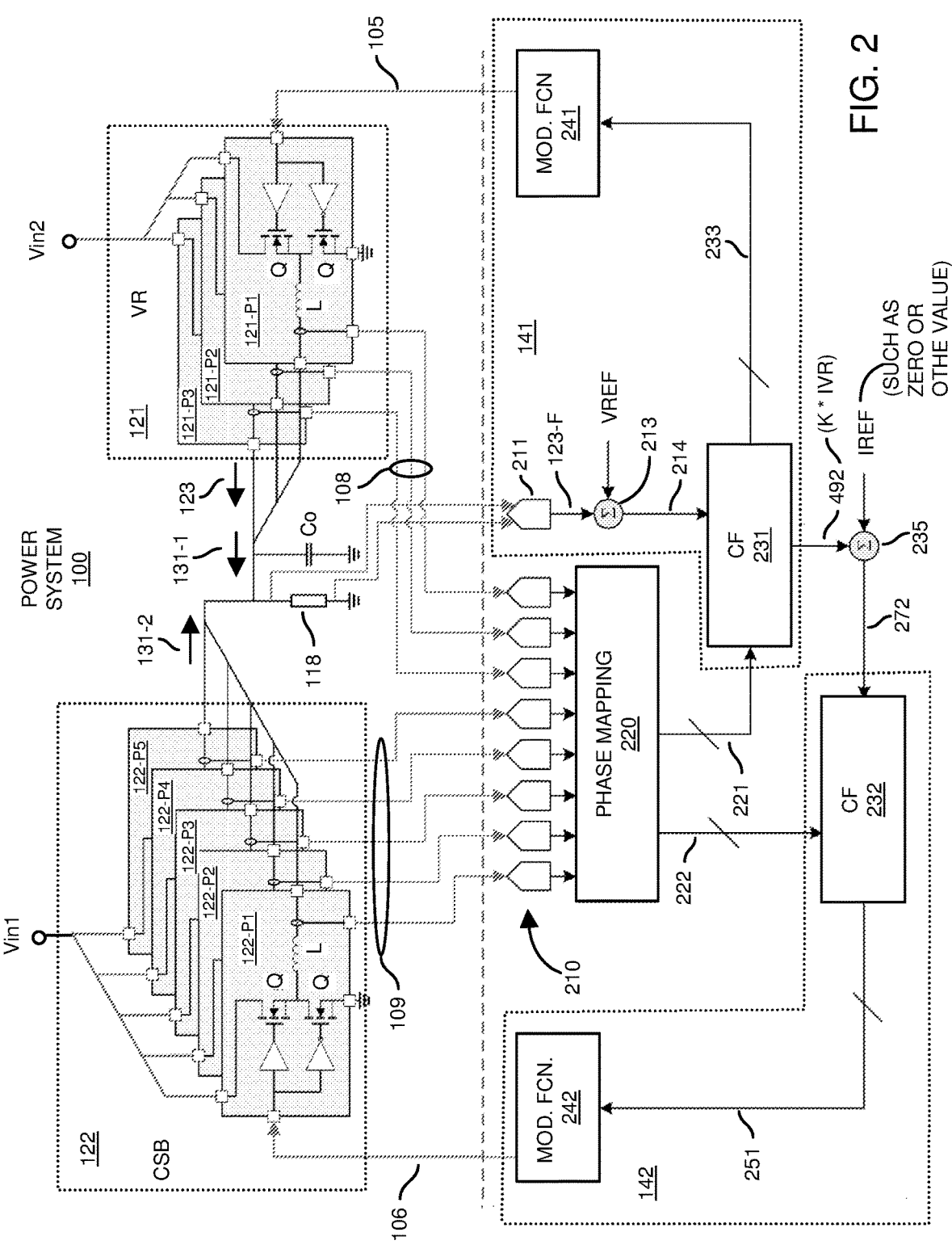
FIG. 2 is an example diagram illustrating implementation of multiple power converter phases to provide power to a dynamic load as discussed herein.

FIG. 2 is an example diagram illustrating implementation of multiple power converters and corresponding one or more phases to provide power to a dynamic load according to examples herein.

In one nonlimiting example, controller 141 and controller 142 (such as a single controller with multiple control functions or multiple controls) are implemented on the same component of silicon (such as a single semiconductor chip), such as including or not including phase mapping 220.

In this example, the controller 141 includes control function 231 and modulation function 241. The controller 142 includes control function 232 and modulation function 242.

Note that, further examples herein include, via the controller 141, varying a number of phases that are activated in the power converter 121 and, via controller 142, varying a number of the phases in the second power converter 122 that are activated depending on a magnitude of power consumption by the load 118 and how much output current is supplied by each of the power converter 121 and power converter 122.

In one example, the power converter 121 is a multi-phase power converter including power converter phase 121-P1, power converter phase 121-P2, power converter phase 121-P3, and so on. In one nonlimiting example, the power converter phases are via buck converter phases, although the power converter 121 can be implemented via any suitable technology.

As further shown, in one example, the power converter 122 is a multi-phase power converter including power converter phase 122-P1, power converter phase 122-P2, power converter phase 122-P3, power converter phase 122-P4, power converter phase 122-P5, and so on. In one nonlimiting example, the power converter phases are via buck converter phases, although the power converter 122 can be implemented via any suitable technology.

Controller 141 can be configured to control any number of the power converter phases in the power converter 121 to produce the output current 131-1. Controller 142 can be configured to control any number of the power converter phases in power converter 122 to produce the output current 131-2.

Note further that power system 100 includes capacitance, Co, coupled to power converter 121 and power converter 122 to store the output voltage 123. Capacitance Co includes one or more capacitors.

As further shown, power system 100 (i.e., power supply) includes current monitors 210 (such as including analog-to-digital converters), voltage monitor 211 (such as including an analog-to-digital converter), modulators 241, modulators 242, phase mapping 220, control function 231, and control function 232.

As their names suggest, each of the monitors 210 (such as associated with monitor 108 and/or monitor 109) monitors a respective output current supplied by a respective phase to the dynamic load 118. Phase mapping 220 outputs detected output current information 221 (such as captured by signal 111) of each of the phases 121-P1, 121-P2, 121-P3, etc., to the control function 231 associated with controller 141.

Phase mapping 220 outputs detected output current information 222 associated with each of the phases 122-P1, 122-P2, 122-P3, 122-P4, etc., to the control function 232 associated with controller 142. In one example, signal 221 includes signal 111 and signal 112 (from FIG. 1) by virtue of being on the same die. CF231 uses both pieces of information for apportionment. In one example, signal 222 in FIG. 2 is strictly signal 111 in FIG. 1.

As further shown, the monitor 211 of the controller 141 monitors the magnitude of the output voltage 123 (across the dynamic load 118) and produces output voltage feedback signal 123-F supplied to the summer 213. Output voltage feedback signal 123-F indicates a magnitude of the output voltage 123. Summer 213 produces an error voltage signal 214 based on a difference between the reference voltage VREF and the output voltage feedback signal 123-F.

Based on the error voltage signal 214 and monitored current supplied by each of the power converter phases in power converter 121 as indicated by the output current information 221, the control function 231 produces control signals 233 supplied to modulation function 241. Modulation function 241 uses the control signals 233 to generate control signals 105 that control operation of the power converter phases in power converter 121 in a manner as previously discussed.

The control function 231 (controller 141) also outputs output current control information such as output current control signal 492 to the summer 235.

Figure 5:
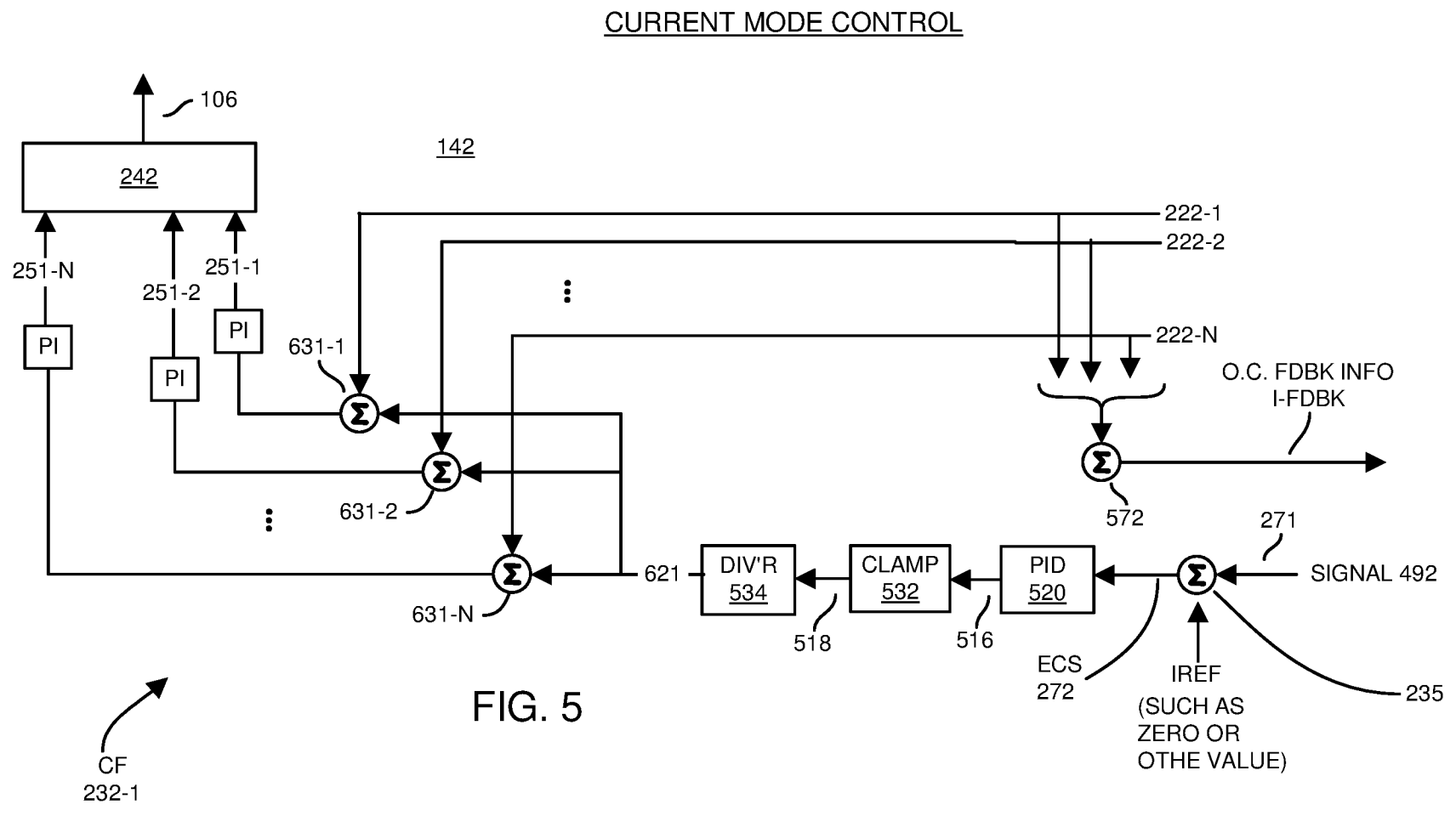
Figure 6:
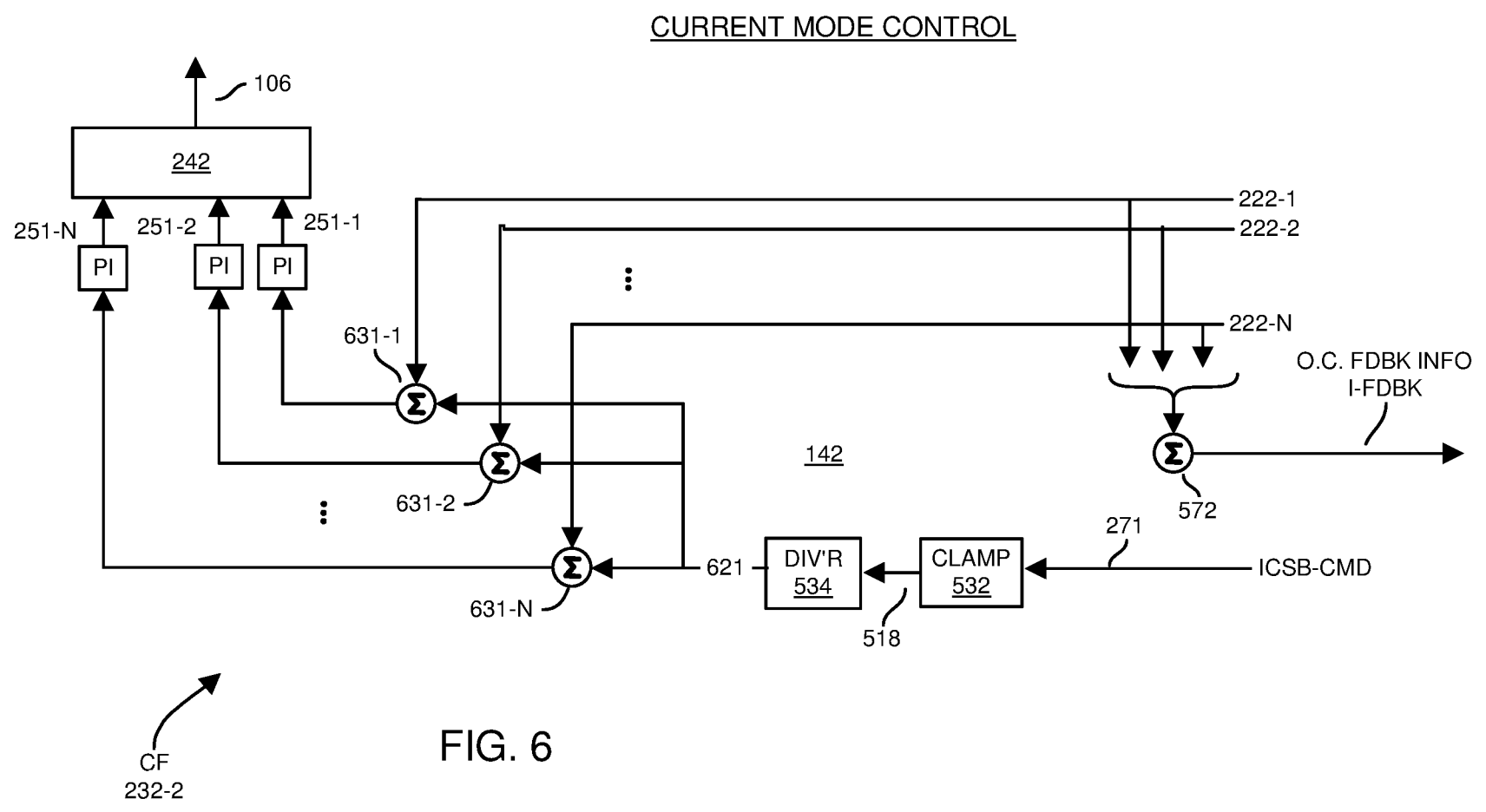

In one example, the summer 235 (such as associated with the controller 142) produces error current signal 272 based on a difference between the current reference IREF (such as zero or other suitable value) and the magnitude of output current 131-2 as indicated by the output current control information 271. As shown in FIG. 5 and FIG. 6 (such as different possible implementations of the control function 232), the control function 232 uses the error current signal 272 (or signal 271 if IREF=0) and the output current information 222 to generate control signals 251 and control operation of the power converter phases of the power converter 122.

Figure 3:
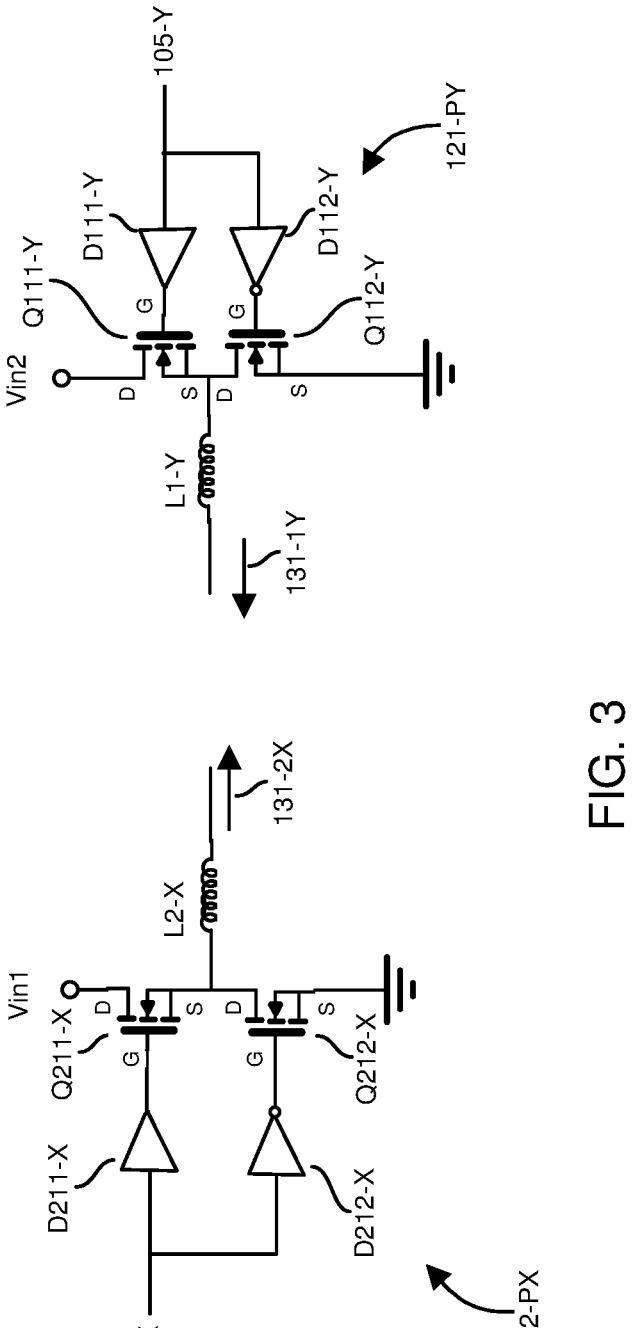
FIG. 3 is an example diagram illustrating details of power converter phases as discussed herein.

FIG. 3 is an example diagram illustrating a payload power converter phase and a thruster power converter phase according to examples herein.

In this example, each of the power converter phases in the power converter 121-PY (where Y is an integer value indicating a phase) includes an inductor L1-Y, switch Q111-Y, switch Q112-Y, driver D111-Y, and driver D112-Y. Note that any of the switches as discussed herein can be implemented in any suitable manner such as via MOSFETs, semiconductor material including GaN and SiC; and any power semiconductor including BJT, IGBT, JFET, etc.

The switch Q111-Y and switch Q112-Y are connected in series between the input voltage Vin2 (or other power source) and a ground reference. For example, the drain (D) of switch Q111-Y is connected to receive the input voltage Vin2; the source(S) of switch Q111-Y is connected to the drain (D) of switch Q112-Y; the source(S) of switch Q112-Y is connected to the ground reference. Inductor L1-Y is connected to the source node of switch Q111-Y and drain node of switch Q112-Y.

Via the control signal 105-Y produced by the controller 141, the controller 141 controls operation of the switches Q111-Y and Q112-Y in the respective power converter phase 121-PY. For example, activation of the high-side switch Q111-Y while the low-side switch Q112-Y is deactivated causes a magnitude of the current 131-Y1 to increase during a respective control cycle; deactivation of the high-side switch Q111-Y while the low-side switch Q112-Y is activated causes a magnitude of the current 131-Y1 to decrease during a respective control cycle. As discussed herein, the controller 141 varies the duty cycle of generating the control signal 105-Y to control a magnitude of the output current 131-1Y supplied from the inductor L1-Y to the dynamic load 118.

In this example, each of the power converter phases 122-PX in the power converter 122 (where X is an integer value indicating a phase) includes an inductor L2-X, switch Q211-X, switch Q212-X, driver D211-X, and driver D212-X. Note that any of the switches as discussed herein can be implemented in any suitable manner such as via MOSFETs, semiconductor material including GaN and SiC; and any power semiconductor including BJT, IGBT, JFET, etc.

The switch Q211-X and switch Q212-X are connected in series between the input voltage Vin1 and a ground reference. For example, the drain (D) of switch Q211-X is connected to receive the input voltage Vin1; the source(S) of switch Q211-X is connected to the drain (D) of switch Q212-X; the source(S) of switch Q212-X is connected to the ground reference. Inductor L2-X is connected to the source node of switch Q211-X and drain node of switch Q212-X.

Via the control signal 106-X produced by the controller 142 for a given power converter phase X, the controller 142 controls operation of the switches in the respective power converter phase 122-PX. For example, activation of the high-side switch Q211-X while the low-side switch Q212-X is deactivated causes a magnitude of the current 131-2X to increase during a respective control cycle; deactivation of the high-side switch Q211-X while the low-side switch Q212-X is activated causes a magnitude of the current 131-2X to decrease during a respective control cycle. As discussed herein, the controller 142 varies the duty cycle of generating the control signal 106-X to control a magnitude of the output current 131-2X supplied to the dynamic load 118.

Figure 4:
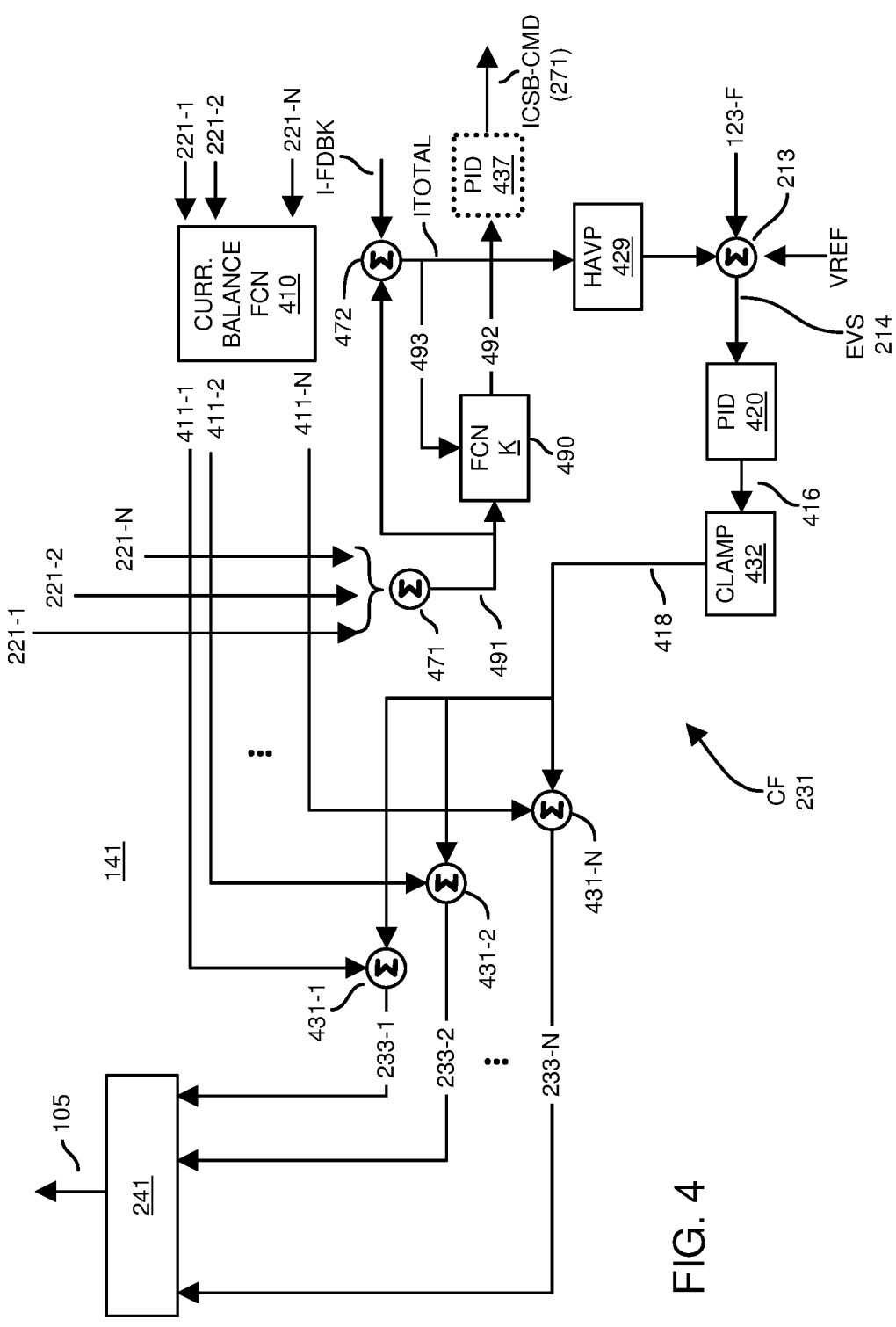
FIG. 4 is an example diagram illustrating implementation of a first control loop using voltage mode control as discussed herein.

FIG. 4 is an example diagram illustrating a thruster control loop using voltage mode control according to examples herein.

In this example, as previously discussed, the summer 213 produces the error voltage signal 214 as a difference between the reference voltage VREF (a.k.a., setpoint reference voltage) and the output voltage feedback signal 123-F (e.g., the error voltage signal 214 generally equals VREF minus a magnitude of the output voltage 123 or vise versa). HAVP 429 (for adaptive voltage positioning if implemented) provides an adjustment to the error voltage signal 214 based on Itotal. The summer 213 outputs the error voltage signal 214 to the compensator 420 (such as PID filter). The compensator 420 produces filtered error signal 416. As its name suggests, as further shown, the clamp 432 potentially clamps the received signal 416 to produce signal 418 supplied to respective summers 431 (431-1, 431-2, etc.).

Note further that the control function 231 can be configured to include current balance function 410. As its name suggests, the current balance function 410 balances current supplied by each of the active phases in the power converter 121. The current balance function 410 receives respective output current information 221 associated with the power converter phases 121-P and produces respective duty cycle control information 411 associated with each of the power converter phases 121-P. For example, the current balance function 410 produces signal 411-1 associated with the power converter phase 121-P1 based on signal 221-1; the current balance function 410 produces signal 411-2 associated with the power converter phase 121-P2 based on signal 221-2; and so on.

Additionally, as further shown, the summer 431-1 sums the signal 411-1 and duty cycle signal 418 to produce duty cycle control signal 233-1 provided to the modulator function 241; the modulator function 241 uses the duty cycle control signal 233-1 to produce control signal 105-1 used to control the high and low side switches in power converter phase 121-P1.

The summer 431-2 sums the signal 411-2 and duty cycle signal 418 to produce duty cycle control signal 233-2 provided to the modulator function 241; the modulator function 241 uses the duty cycle control signal 233-2 to produce control signal 105-2 used to control the high and low side switches in power converter phase 121-P2.

The summer 431-N sums the signal 411-N and duty cycle signal 418 to produce duty cycle control signal 233-N provided to the modulator function 241; the modulator function 241 uses the duty cycle control signal 233-N to produce control signal 105-N used to control the power converter phase 121-PN.

In a manner as previously discussed, generation of the control signals 105 maintains a magnitude of the output voltage 123 with respect to the setpoint reference voltage VREF.

As previously discussed, each of the signal 221-1, 221-2, . . . , 221-N indicates a respective magnitude of current supplied by the phase to the load 118. As further shown, the summer 471 sums signals 221-1, 221-2, . . . 221-N, to produce the signal 491 representing or indicating a magnitude of the output current 131-1.

Summer 472 sums the signal 491 (indicating the magnitude of output current 131-1) and the signal I-FDBK (indicating magnitude of the output current 131-2) to produce signal 493 (ITOTAL) indicating a total magnitude of output current 131-T (ITOTAL).

Function 490 (such as a gain stage) derives control signal ICSB-CMD (current setpoint reference value indicating the magnitude of current to be provided by the power converter 122) based on a magnitude of the total output current 131-T (ITOTAL) in a manner as previously discussed (and as further discussed herein) such that the power converter 121 and power converter 122 supply a different ratio of output current to the load 118 depending on a magnitude of the total output current 131-T. In one example, the function 490 is a gain multiplier of gain K whose magnitude depends on ITOTAL. In one embodiment, signal 492 is equal to K times signal 491 (magnitude of current 131-1).

Thus, the controller 141 and corresponding control function 231 can be configured to receive a first signal 491 indicating the magnitude of the first output current 131-1; receive a second signal I-FDBK indicating the magnitude of the second output current 131-2; sum the first signal 471 and the second signal I-FDBK to produce a third signal ITOTAL (493) indicative of the magnitude of the total of output current consumed by the dynamic load; and multiply the signal 491 by a gain value, K, to produce an output current control signal 492 supplied to the second power converter 122 to control the magnitude of the second output current 131-2.

As further discussed herein, the controller 141 can be configured to select the magnitude of the gain value K depending on which of multiple output current ranges the magnitude of the total output current ITOTAL resides. Thus, the magnitude of the gain multiplier value K is a function of a magnitude of the signal 493 (ITOTAL).

Note that the control function 231 may or may not include the compensator 437 such as a PID filter. In a first system implementation, when the compensator 437 is not present, the signal ICSB-CMD (271) equals the signal 492. A first system implementation may include the controller 141 (such as without the compensator 437, signal 271 equals signal 492) as shown in FIG. 4 as well as the controller 142 shown in FIG. 5.

When the compensator 437 is present, the compensator 437 produces the signal ICSB-CMD (271) by PID filtering the received signal 492. In a second system implementation, when the compensator 437 is present, the signal ICSB-CMD (271) equals PID filtering of the signal 492. The second system implementation may include the controller 141 as shown in FIG. 4 (with the compensator 437) as well as the controller 142 shown in FIG. 6.

FIG. 5 is an example diagram illustrating a control loop according to examples herein.

In general, PID 437 and PID 520 provide a similar function. The difference is the location of the PID. If PID 437 is present in the VR controller 141, then ICSB-CMD 271 is transmitted to the CSB controller 142, as in FIG. 6. If PID 437 is not present in the circuit, then the VR controller 141 transmits signal 492 (which is K*IVR) to the CSB controller of FIG. 5. That means signal 516 in FIG. 5 is equivalent to signal 271.

FIGS. 5 and 6 show the CSB control loops when the PID is in the CSB controller or VR controller, respectively. In this example of FIG. 5, as previously discussed, the summer 235 produces the error current signal 272 as a difference between the reference current IREF (setpoint reference current value such as zero or other suitable value) and the signal 492 received from controller 141. As previously discussed, signal 492 notifies the controller 142 of the magnitude of the output current 131-2 to be supplied by the power converter 122 to the dynamic load 118.

The compensator 520 (such as a PID compensator or PID filter including a summation of Proportional-Integral-Derivative terms) receives the error current signal 272 and produces filtered error current signal 516. The summer 235 can be configured to produce the error current signal 272 as a difference between the reference current IREF and the commanded magnitude of current as indicated by command 492. The summer 235 outputs the error current signal 272 to the compensator (such as PID filter 520). The compensator 520 (such as a PID filter) produces filtered error current signal 516 based on the received error current signal 272. As its name suggests, the clamper circuit 532 potentially clamps the signal 516 to produce signal 518.

Further in this example, based on the filtered and potentially clamped error signal 518, the divider 534 produces per phase current reference signal 621 supplied to each of the summers 431 (631-1, 631-2, etc.) such that the power converter phases associated with the power converter 122 supply a total output current at a magnitude as indicated by the signal ICSB-CMD.

As further shown, the summer 631-1 sums the signal 222-1 and current reference signal 621 to produce a respective output signal provided to a respective PI filter to produce duty cycle control signal 251-1; the modulator function 242 receives the duty cycle control signal 251-1 and uses it to produce control signal 106-1 used to control the power converter phase 122-P1.

The summer 631-2 sums the signal 222-2 and current reference signal 621 to produce a respective output signal provided to a respective PI filter to produce duty cycle control signal 251-2; the modulator function 242 receives the duty cycle control signal 251-2 and uses it to produce control signal 106-2 used to control the power converter phase 122-P2.

The summer 631-N sums the signal 222-N and current reference signal 621 to produce a respective output signal provided to a respective PI filter to produce duty cycle control signal 251-N; the modulator function 242 receives the duty cycle control signal 251-N and uses it to produce control signal 106-N used to control the power converter phase 122-PN.

Generation and adjustment of the control signals 251 via the control function 232-1 and subsequent implementation of the modulation function 242 to produce the control signals 106 maintains the magnitude of the output currents of the power converter phases in the power converter 122 such that a combination of the power converter phases associated with the power converter 122 produce the output current 131-2 generally to equal a magnitude of output current as specified by the filtering of signal 492.

As further shown, the control function 232-1 of controller 142 can be configured to include summer 572. Summer 572 receives the feedback such as magnitudes of current 222-1, 222-2, . . . , 222-N, (power converter phase 122-P1 supplies output current at a first magnitude 222-1; power converter phase 122-P2 supplies output current at a first magnitude 222-2; etc.) supplied by each of the power converter phases of the power converter 122 to produce a respective signal I-FDBK, indicating a magnitude of the output current 131-2 supplied by the power converter 122 to the dynamic load 118. More specifically, summer 572 sums signals 222-1, 222-2, . . . , 222-N to produce the signal I-FDBK.

FIG. 6 is an example diagram illustrating a second control loop using current mode control as discussed herein.

This instance of the control function 232 (such as control function 232-2) operates in a similar manner as previously discussed in FIG. 5. However, in this example, the clamp 532 receives signal 271 (such as ICSB-CMD) to produce the signal 518. The divider 534 receives signal 518 and produces corresponding signal 621. In general, in one example, the divider 534 splits the received call for output current as specified by the signal 621 into an amount per phase depending on how many phases in the power converter 122 are activated to produce the output current 131-2.

Figure 7C:
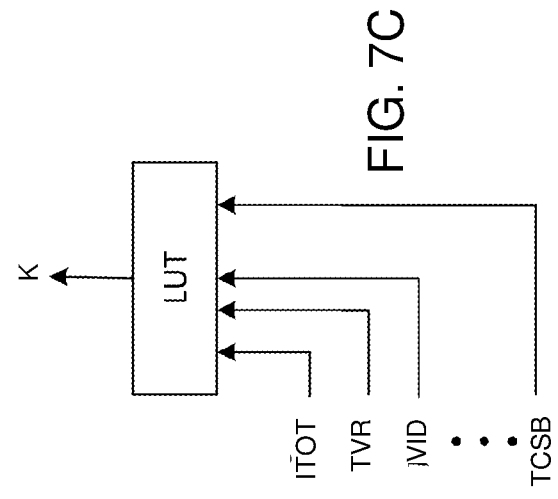
FIGS. 7A, 7B, and 7C are example diagrams illustrating implementation of different techniques to generate an apportionment value K for different magnitudes of total output current as discussed herein.
Figure 7A:
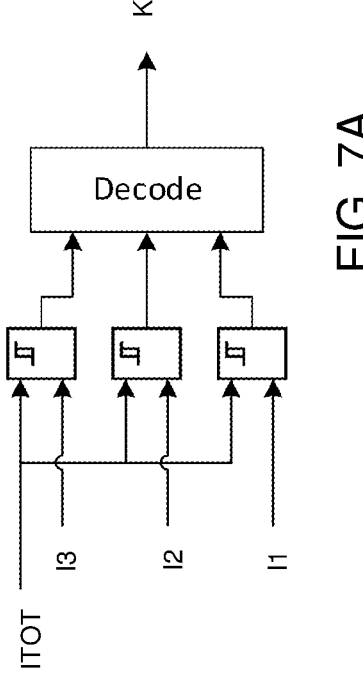
Figure 7B:
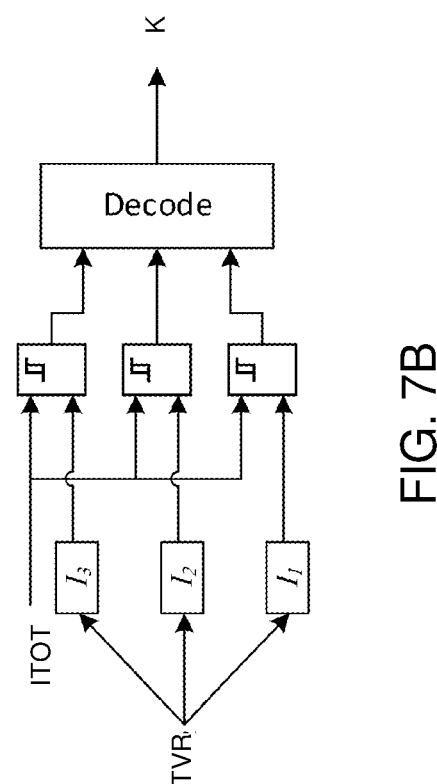

FIGS. 7A, 7B, and 7C are example diagrams illustrating implementation of different techniques to generate an apportionment value K for different magnitudes of total output current as discussed herein.

In FIG. 7A, the decoder such as function 490 produces the value K based on ITOTAL and different discrete threshold levels to determine a range in which the total magnitude ITOTAL falls.

In FIG. 7B, the decoder such as function 490 produces the value K based on temperature dependence such as voltage regulator temperature TVR being used as a feedback signal. This example shown uses temperature-adaptive current thresholds. As the voltage regulator temperature TVR increases, current thresholds I1, I2, etc., are adjusted to change scalar value K; and therefore command more current from CSB and relieve power processing burden from voltage regulator (power converter 121).

FIG. 7C is a Multi-Dimensional Optimization in which, in addition to total current ITOTAL and voltage regulator temperature TVR, other parameters can be used to determine scalar value K associated with function 490. For example, a VID (voltage setpoint VREF) can be used to modify thresholds to improve efficiency. Temperature of CSB phases (a.k.a., TCSB) can be used to push current back to voltage regulator. Input voltages of power converters 121 and 122 may also be used to adjust the apportionment. The look-up table LUT allows finer granularity of thresholds. Variables can also be linearized to implement a continuously modified K if desired.

Figure 8:
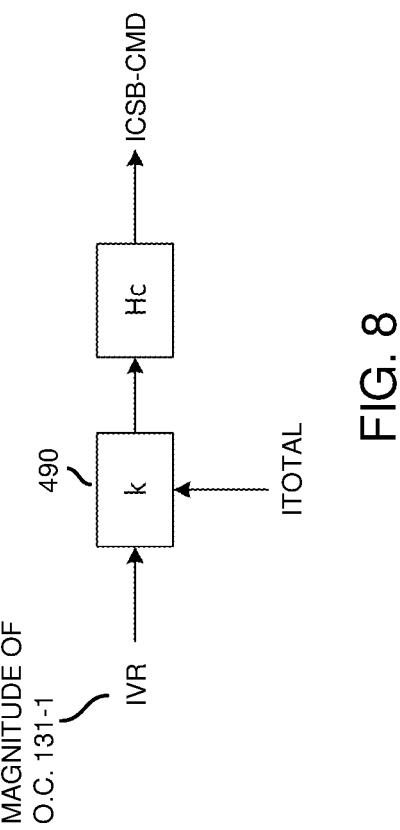
FIG. 8 is an example diagram illustrating implementation of current apportionment via implementation of function K as discussed herein.

FIG. 8 is an example diagram illustrating implementation of current apportionment via implementation of function K as discussed herein.

As previously discussed, this example includes a control loop which modifies/scales voltage regulator current (output current 131-1 or signal IVR used as the feedback signal) into a CSB command control ICSB-CMD, apportioning the magnitude of the output current 131-1 and output current 131-2 depending on a total magnitude of output current 131-T (ITOTAL). This is the general block diagram of generating ICSB-CMD from IVR. K*IVR, put through a compensation network (Hc=PID), results in ICSB-CMD. In FIG. 5 and corresponding configuration, the PID 520 is the CSB control loop. In FIG. 6 and corresponding configuration, the PID is in the VR control loop.

Figure 9:
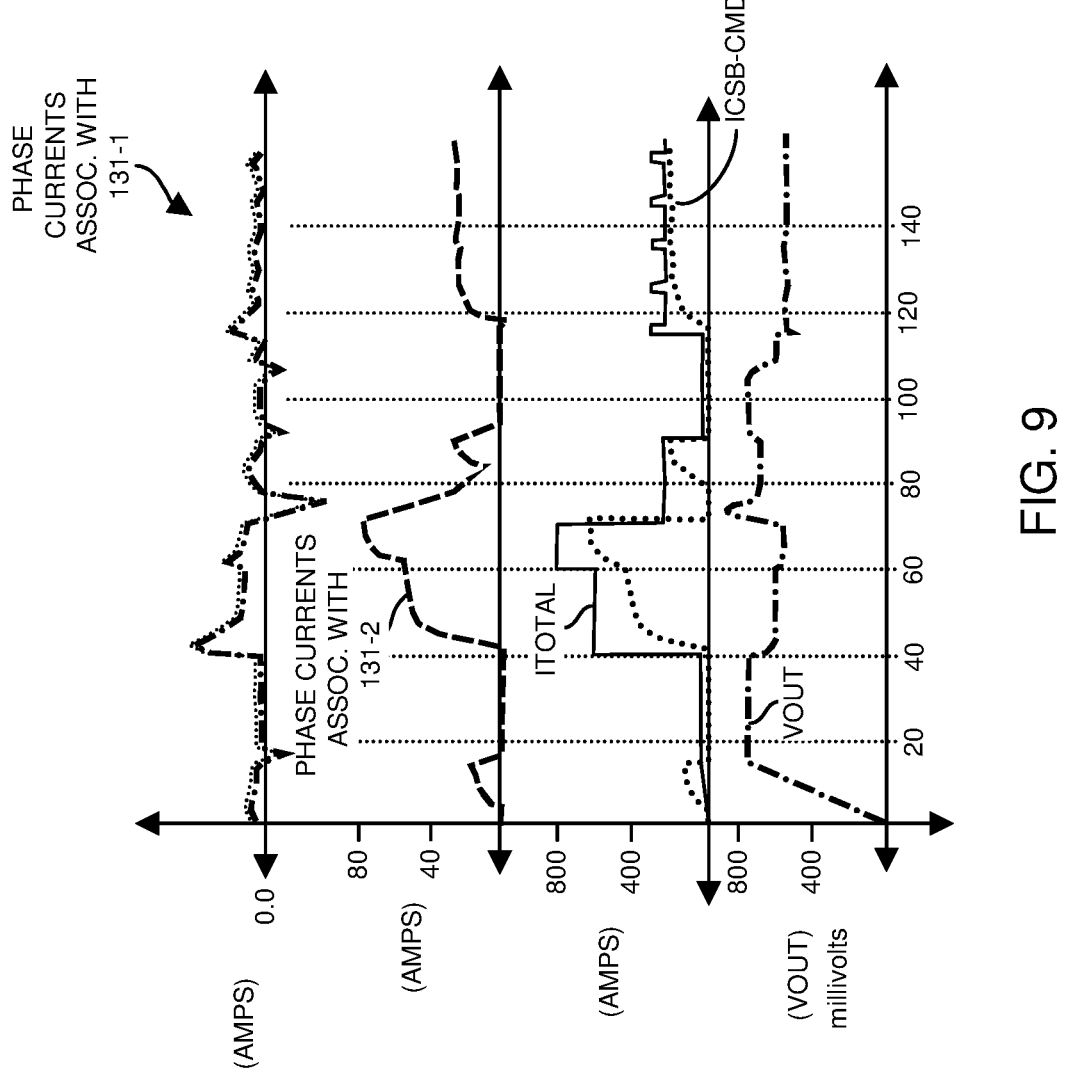
FIG. 9 is an example timing diagram illustrating apportionment of output current amongst multiple power converters as discussed herein.

FIG. 9 is an example timing diagram illustrating apportionment of output current amongst multiple power converter as discussed herein.

In this example, the power converter 122 produces the output current 131-2. The dynamic load 118 consumes total output current 131-T (ITOTAL). Apportionment of output currents 131-1 and 131-2 varies over time depending on magnitude of ITOTAL.

Figure 10:
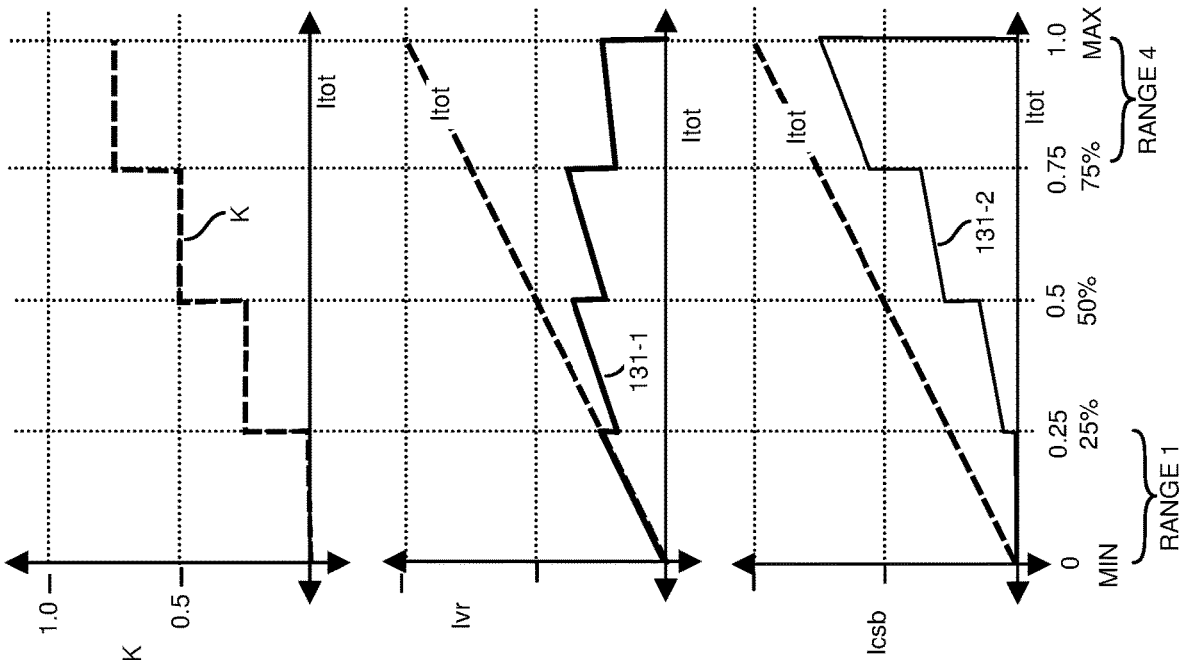
FIG. 10 is an example timing diagram illustrating apportionment of output current amongst multiple power converters based on multiplier function K as discussed herein.

FIG. 10 is an example diagram illustrating apportionment of output current amongst multiple power converter based on function K as discussed herein.

In this example, the function 490 varies a magnitude of the multiplier value K depending on a range in which ITOTAL falls.

For example, if output current ITOTAL falls within a 0 to 25% range of maximum output current value, then the function 490 produces the magnitude of the multiplier value K to be 0. In such an instance, the power converter 121 produces 100% of the total output current 131-T (ITOTAL) and the power converter 122 supplies 0% of the total output current 131-T (ITOTAL). ICSB-CMD indicates to provide zero amps of current.

If output current ITOTAL falls within a 25% to 50% range of maximum output current value, then the function 490 produces the magnitude of the multiplier value K to be 0.25. In such an instance, the power converter 121 produces 75% of the total output current 131-T (ITOTAL) and the power converter 122 supplies 25% of the total output current 131-T (ITOTAL). ICSB-CMD indicates to provide 25% of total amps of current ITOTAL.

If output current ITOTAL falls within a 50% to 75% range of maximum output current value, then the function 490 produces the magnitude of the multiplier value K to be 0.50. In such an instance, the power converter 121 produces 50% of the total output current 131-T (ITOTAL) and the power converter 122 supplies 50% of the total output current 131-T (ITOTAL). ICSB-CMD indicates to provide 50% of total amps of current ITOTAL.

If output current ITOTAL falls within a 75% to 100% range of maximum output current value, then the function 490 produces the magnitude of the multiplier value K to be 0.75. In such an instance, the power converter 121 produces 25% of the total output current 131-T (ITOTAL) and the power converter 122 supplies 75% of the total output current 131-T (ITOTAL). ICSB-CMD indicates to provide 75% of total amps of current ITOTAL.

Thus, the controller 141 can be configured to, over time, vary a ratio of the magnitude of the second output current 131-2 with respect to the magnitude of the first output current 131-1 in accordance with a control function depending on the total magnitude of output current ITOTAL.

This example illustrates that the controller 141 is operative to increase a ratio of the magnitude of the second output current 131-2 with respect to the magnitude of the first output current 131-1 for larger magnitudes of the total output current ITOTAL (range 4) consumed by the dynamic load 118; the controller 141 is operative to decrease the ratio of the magnitude of the second output current 131-2 with respect to the magnitude of the first output current 131-1 for smaller magnitudes of the total output current ITOTAL (range 1) consumed by the dynamic load.

Figure 11:
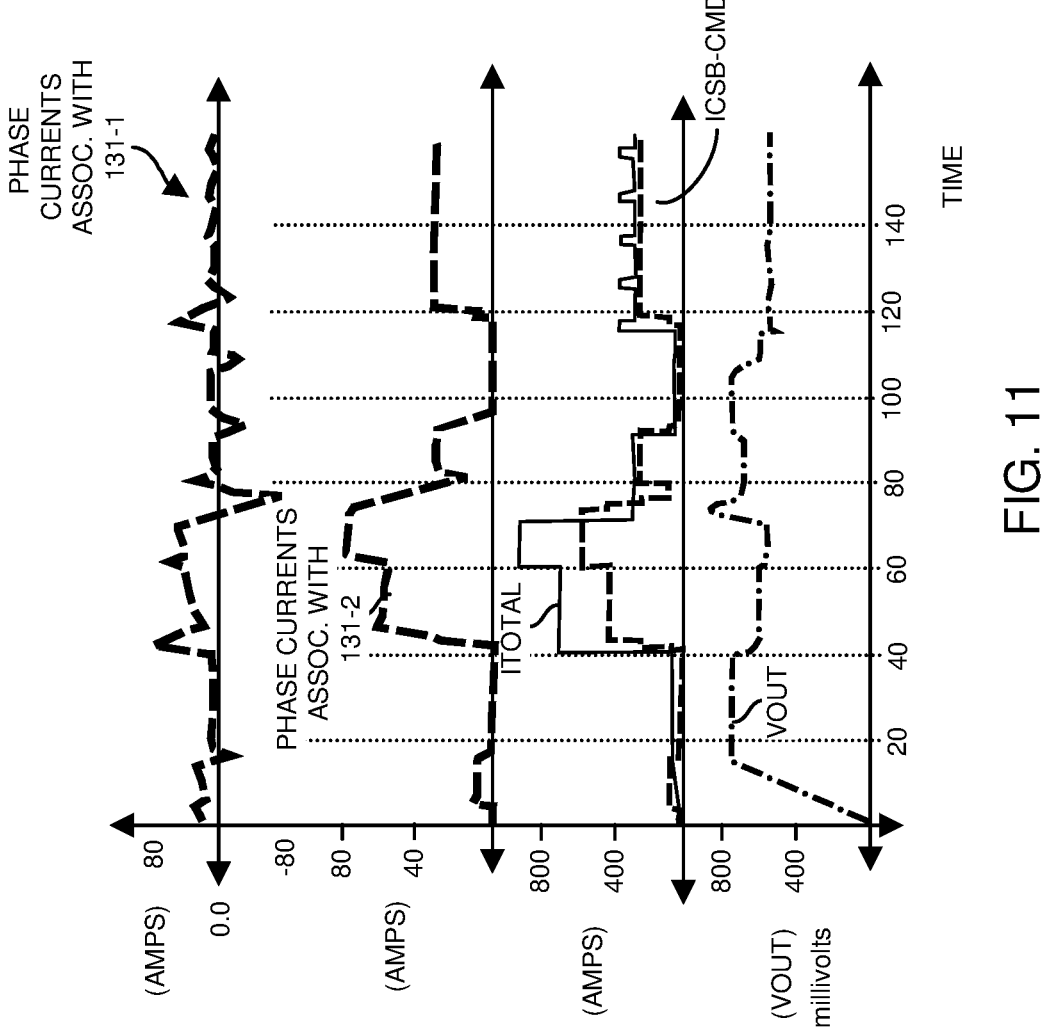
FIG. 11 is an example timing diagram illustrating apportionment of output current amongst multiple power converters as discussed herein.

FIG. 11 is an example timing diagram illustrating apportionment of output current amongst multiple power converters as discussed herein.

In this example, the power converter 122 produces the output current 131-2. The dynamic load 118 consumes total output current 131-T (ITOTAL). The different portions of output current of power converter 121 and power converter 122 depending on a magnitude of I-TOTAL.

Figure 12:
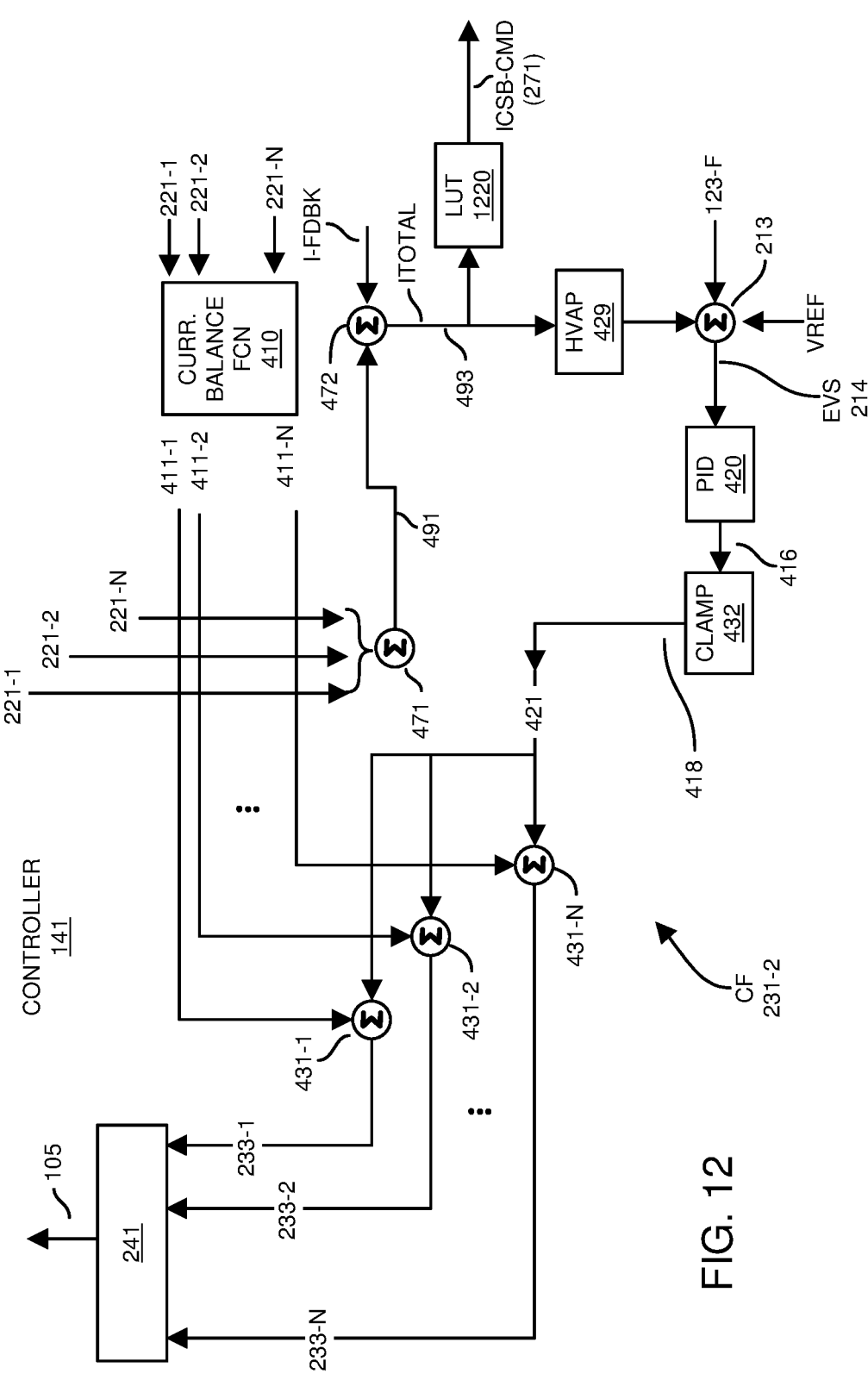
FIG. 12 is an example diagram illustrating implementation of a control loop using current mode control as discussed herein.

FIG. 12 is an example diagram illustrating implementation of a control loop using voltage mode control as discussed herein.

In this example, in a similar manner, as previously discussed, the summer 213 produces the error voltage signal 214 as a difference between the reference voltage VREF (a.k.a., setpoint reference voltage) and the output voltage feedback signal 123-F (e.g., the error voltage signal 214 generally equals VREF minus a magnitude of the output voltage 123 or vice versa). HAVP 429 (for adaptive voltage positioning if implemented) provides an adjustment to the error voltage signal 214 based on Itotal.

The summer 213 outputs the error voltage signal 214 to the compensator (such as PID filter 420). The compensator 420 (such as a PID filter) produces filtered error signal 416. As its name suggests, the clamp 432 optionally clamps the received signal 416 to produce signal 418 supplied to respective summers 431 (431-1, 431-2, etc.).

Note further that the control function 231 can be configured to include current balance function 410. As its name suggests, the current balance function 410 balances current supplied by each of the active phases in the power converter 121. The current balance function 410 receives respective output current information 221 associated with the power converter phases 121-P and produces respective duty cycle control information 411 associated with each of the power converter phases 121-P. For example, the current balance function 410 produces signal 411-1 associated with the power converter phase 121-P1 based on signal 221-1; the current balance function 410 produces signal 411-2 associated with the power converter phase 121-P2 based on signal 221-2; and so on.

Additionally, as further shown, the summer 431-1 sums the signal 411-1 and duty cycle signal 418 to produce duty cycle control signal 233-1 provided to the modulator function 241; the modulator function 241 uses the duty cycle control signal 233-1 to produce control signal 105-1 used to control the high and low side switches in power converter phase 121-P1.

The summer 431-2 sums the signal 411-2 and duty cycle signal 418 to produce duty cycle control signal 233-2 provided to the modulator function 241; the modulator function 241 uses the duty cycle control signal 233-2 to produce control signal 105-2 used to control the high and low side switches in power converter phase 121-P2.

The summer 431-N sums the signal 411-N and duty cycle signal 418 to produce duty cycle control signal 233-N provided to the modulator function 241; the modulator function 241 uses the duty cycle control signal 233-N to produce control signal 105-N used to control the power converter phase 121-PN.

In a manner as previously discussed, generation of the control signals 105 maintains a magnitude of the output voltage 123 with respect to the setpoint reference voltage VREF.

As previously discussed, each of the signal 221-1, 221-2, . . . , 221-N indicates a respective magnitude of current supplied by the phase to the load 118. As further shown, the summer 471 sums signals 221-1, 221-2, . . . 221-N, to produce the signal 491 representing or indicating a total magnitude of the output current 131-1.

Summer 472 sums the signal 491 (indicating the magnitude of output current 131-1) and the signal I-FDBK (indicating magnitude of the output current 131-2) to produce signal 493 (ITOTAL) indicating a total magnitude of output current 131-T (ITOTAL).

The look-up table function 1220 derives control signal ICSB-CMD 271 (such as current setpoint reference value indicating the magnitude of current to be provided by the power converter 122) based on a magnitude of the total output current 131-T (ITOTAL or signal 493) in a manner as previously discussed (and as further discussed herein) such that the power converter 121 and power converter 122 supply a different ratio of output current to the load 118 depending on a magnitude of the total output current 131-T.

Note that the control function 231-2 is implemented in conjunction with the control function 232 in FIG. 6 to provide apportionment of current to power the load 118.

Figures 13A, 13B, 13C:
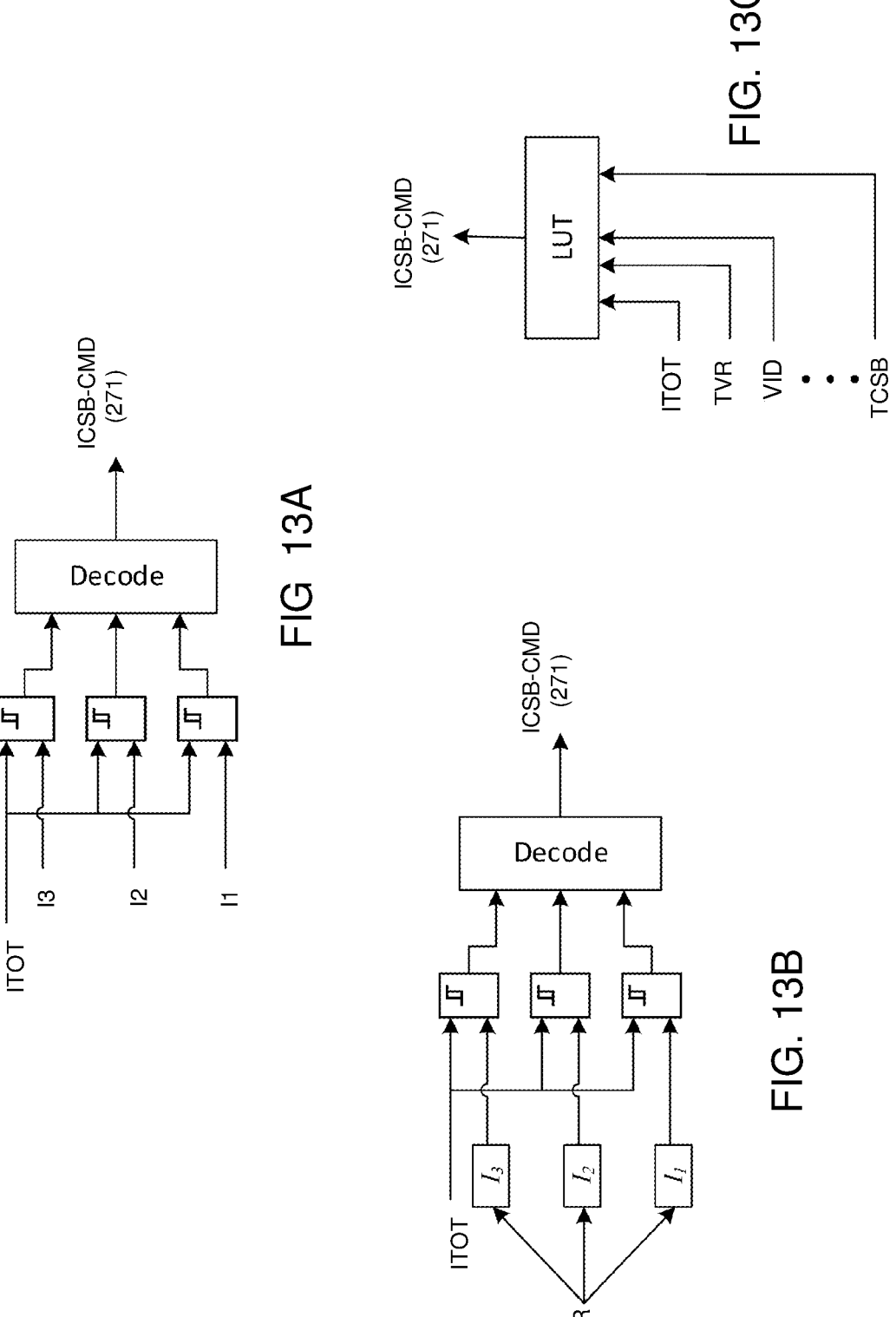
FIGS. 13A, 13B, and 13C are example diagrams illustrating implementation of different techniques to generate an apportionment value K for different magnitudes of total output current as discussed herein.

FIGS. 13A, 13B, and 13C are example diagrams illustrating implementation of different techniques to generate an apportionment ICSB-CMD for different magnitudes of total output current as discussed herein.

In FIG. 13A, a magnitude of ICSB-CMD varies depending on discrete thresholds and a range in which Itotal falls.

In FIG. 13B, the magnitude of ICSB-CMD depends on temperature. The temperature of the voltage regulator can be used as a feedback signal. The example shown uses temperature-adaptive current thresholds. For example, as the VR (voltage regulator) temperature increases, current thresholds I1, I2, etc., will adjust to change the magnitude of ICSB-CMD; and therefore command more current from CSB and relieve power processing burden from the voltage regulator.

In FIG. 13C illustrates Multi-Dimensional Optimization. For example, in addition to total current Itotal and VR temperature, other parameters can be used to control a magnitude of ICSB-CMD. For example, the VID (voltage setpoint) can be used to modify thresholds to improve efficiency. The temperature of CSB phases (power converter 122) can be used to push output current back to being provided by the VR (power converter 121). Input voltages of power converters 121 and 122 may also be used to adjust the apportionment. The implementation of look-up table LUT allows finer granularity of thresholds. Note that variables can also be linearized to implement a continuously modified ICSB-CMD.

Figure 14:
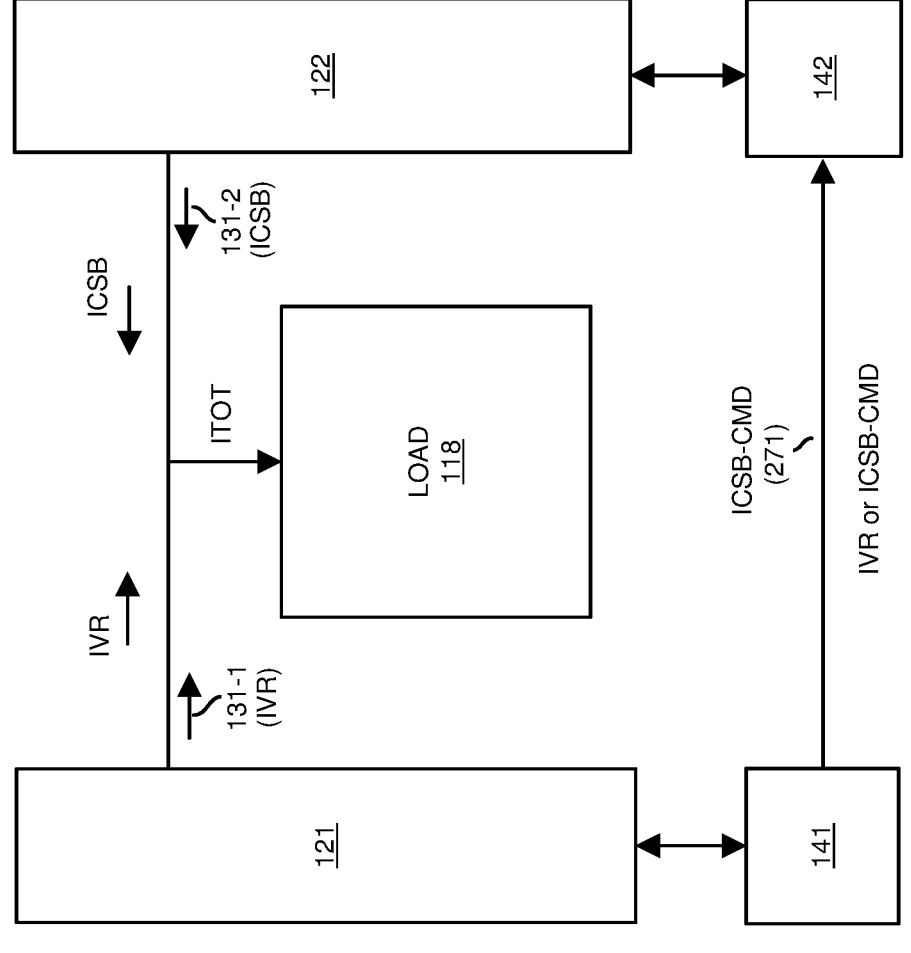
FIG. 14 is an example diagram illustrating control of output current magnitudes from different power converters as discussed herein.

FIG. 14 is an example diagram illustrating control of output current magnitudes from different power converters as discussed herein.

In this example, the controller 141 controls power converter 121 to provide output current 131-1 to the dynamic load 118. Based on received control signal 271, the controller 142 controls power converter 122 to provide output current 131-2 to the dynamic load 118.

Figure 15:
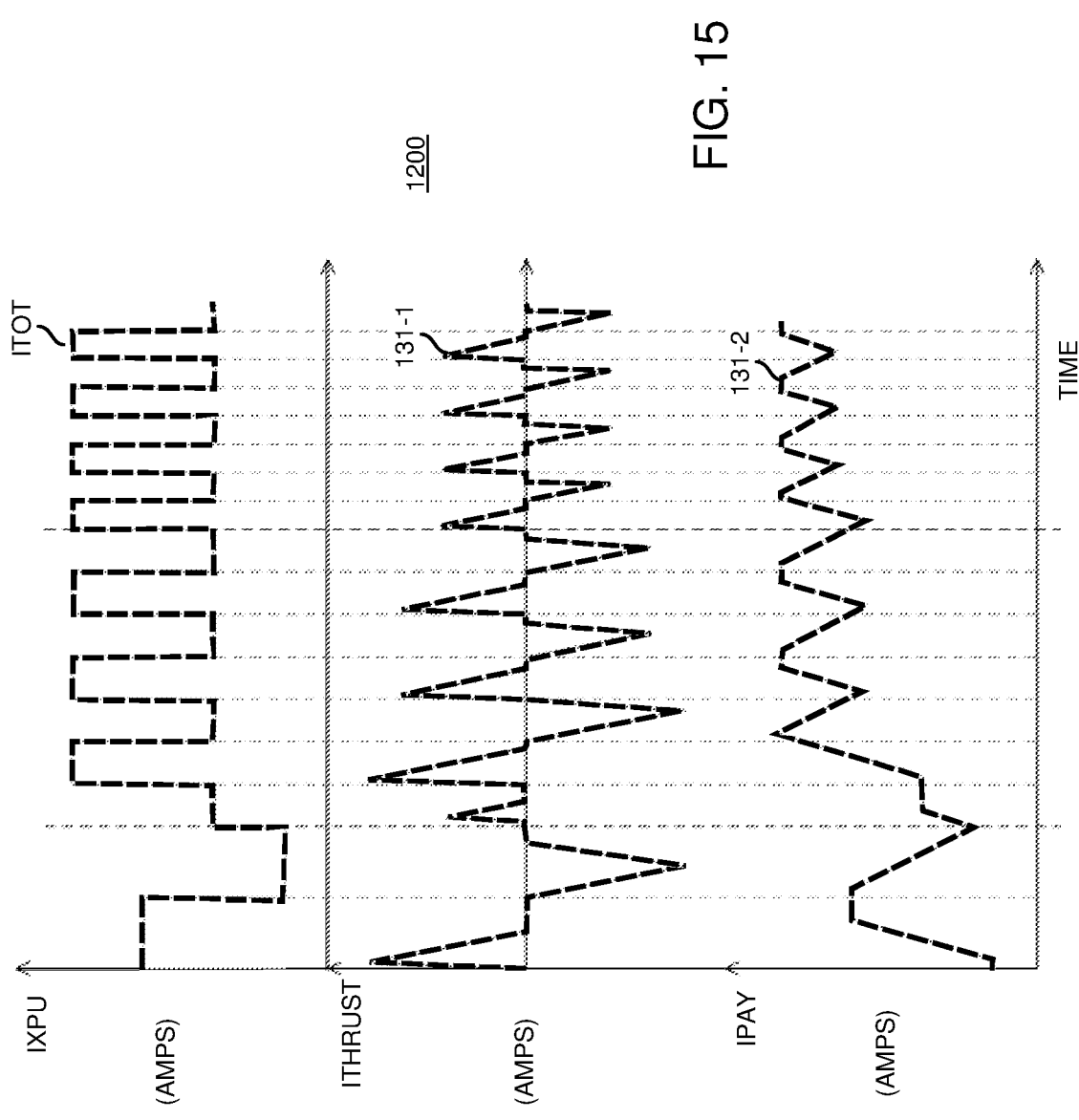
FIG. 15 is an example timing diagram illustrating apportionment of output current amongst power converters as discussed herein.

FIG. 15 is an example timing diagram illustrating apportionment of output current amongst power converters as discussed herein.

Timing diagram 1200 illustrates how the different power converters supply different amounts of output current to the dynamic load 118 over time.

Figure 16:
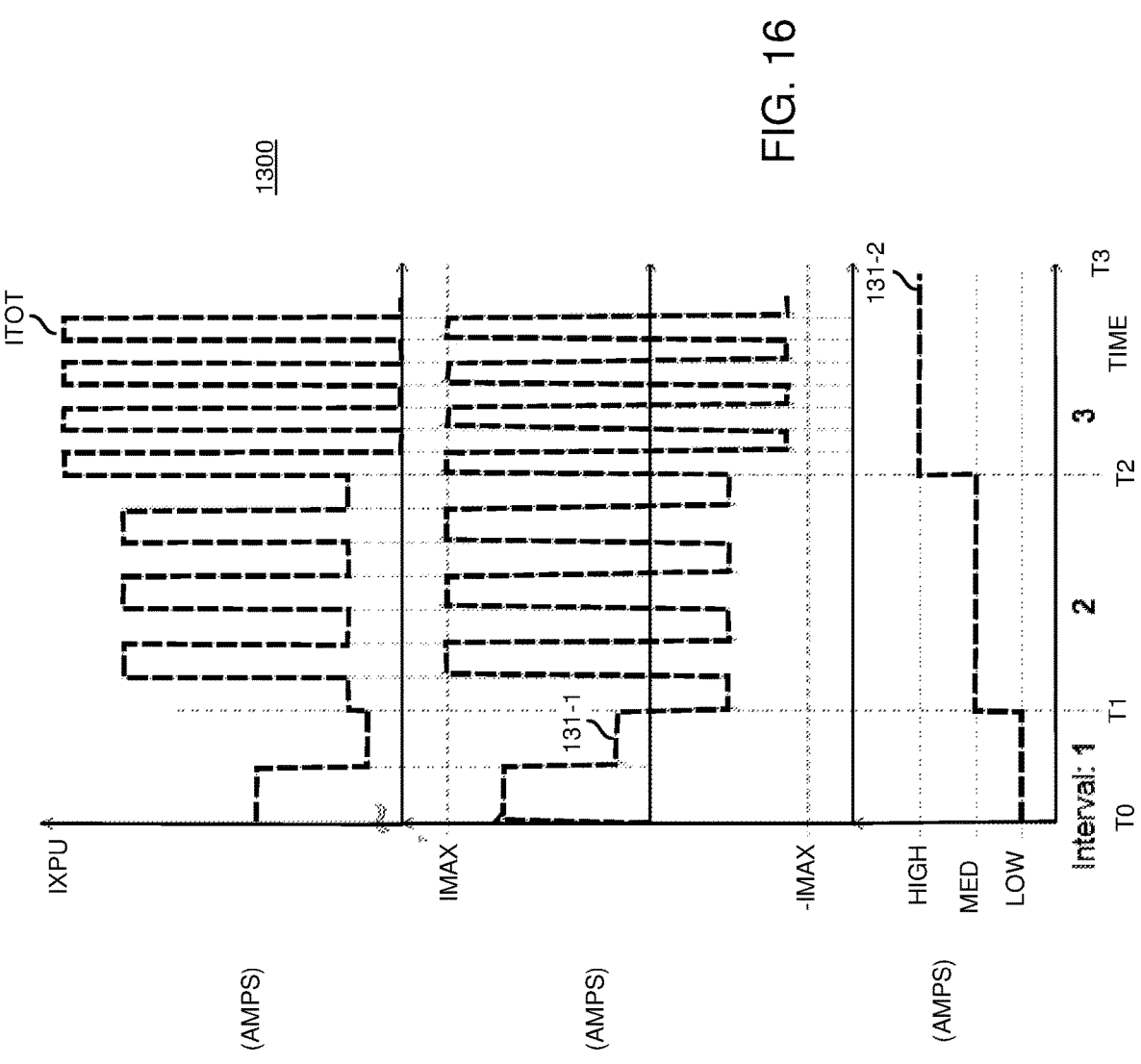
FIG. 16 is an example timing diagram illustrating apportionment of output current amongst power converters as discussed herein.

FIG. 16 is an example timing diagram illustrating static apportionment of output current amongst power converters as discussed herein.

Later in this specification, we use the term static and dynamic when describing multiple CSBs. FIGS. 11 and 16 show "static" CSB behavior. In one example, note that "static" means static for a given operating point.

Timing diagram 1300 illustrates how the different power converters supply different amounts of output current to the dynamic load 118 over time.

Between time T0 and time T1, the voltage regulator (power converter 121 and controller 141) responds to transients to provide regulation, and also provides some non-zero average power. The controller 141 sends ICSB-CMD to the CSB controller (controller 142). The controller 142 controls the CSB phases in power converter 122 to provide a steady current with magnitude LOW.

Between time T1 and time T2, the output current transients have increased in magnitude. The controller 141 responds to the transients and has increased the commanded current from the CSB (to MED). The controller 141 still provides some average power, but now its minimum instantaneous current dips below zero.

Between time T2 and time T3, the dynamic load 118 transients have increased further. The controller 141 commands HIGH output current from CSB (power converter 122). The controller 141 still provides a non-zero average power.

In this example, increasing ICSB-CMD to increase current provided by CSB results in: i) more CSB phases activated in power converter 122 to provide the output current, ii) reduction in average power provided by the power converter 121 (VR average power must always be greater than or equal to zero to avoid circulating current), and iii) reduction of VR (power converter 122) minimum current. The increase in commanded current may be to reduce VR thermals, to maintain some peak VR current, to maintain some value of average power provided by the VR, etc.

Figure 17:
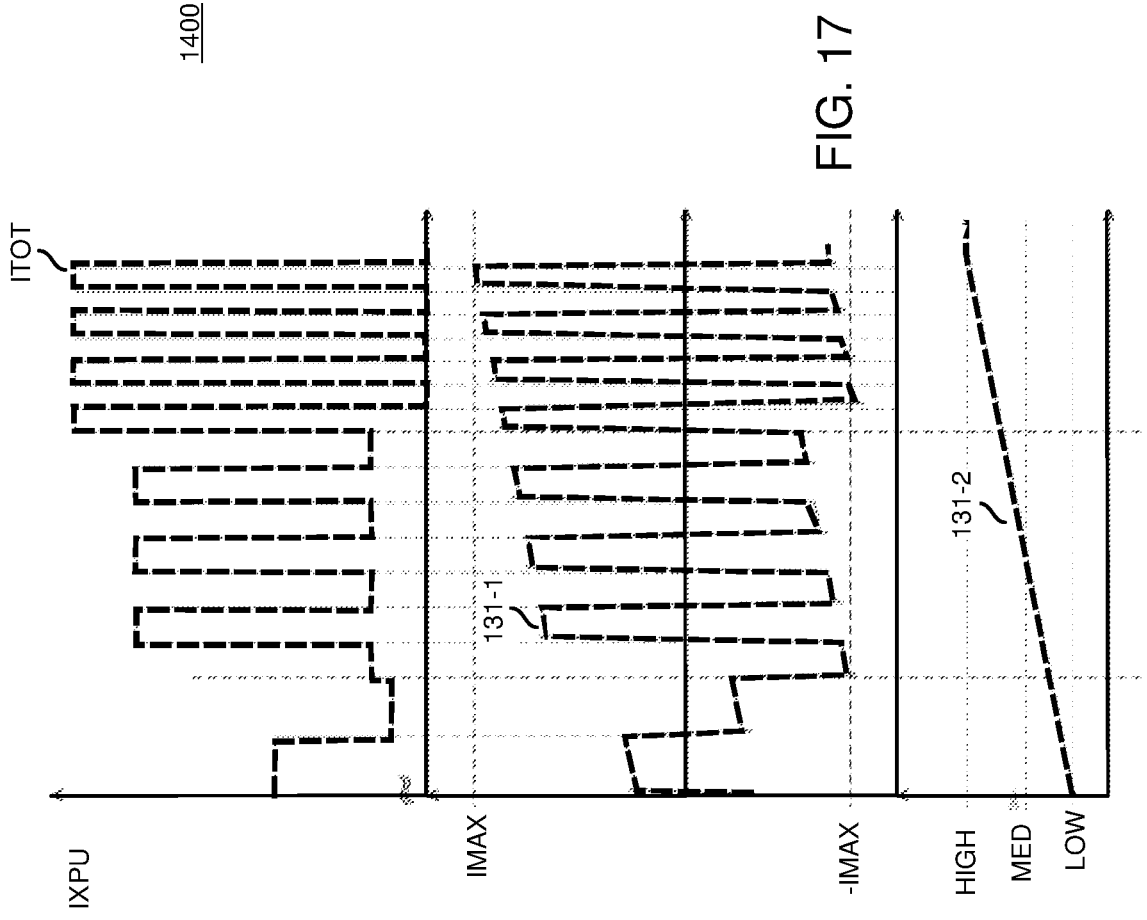
FIG. 17 is an example timing diagram illustrating apportionment of output current amongst power converters as discussed herein.

FIG. 17 is an example timing diagram illustrating dynamic apportionment of output current amongst power converters as discussed herein.

Timing diagram 1400 illustrates how the different power converters supply different amounts of output current to the dynamic load 118 over time.

Figure 18:
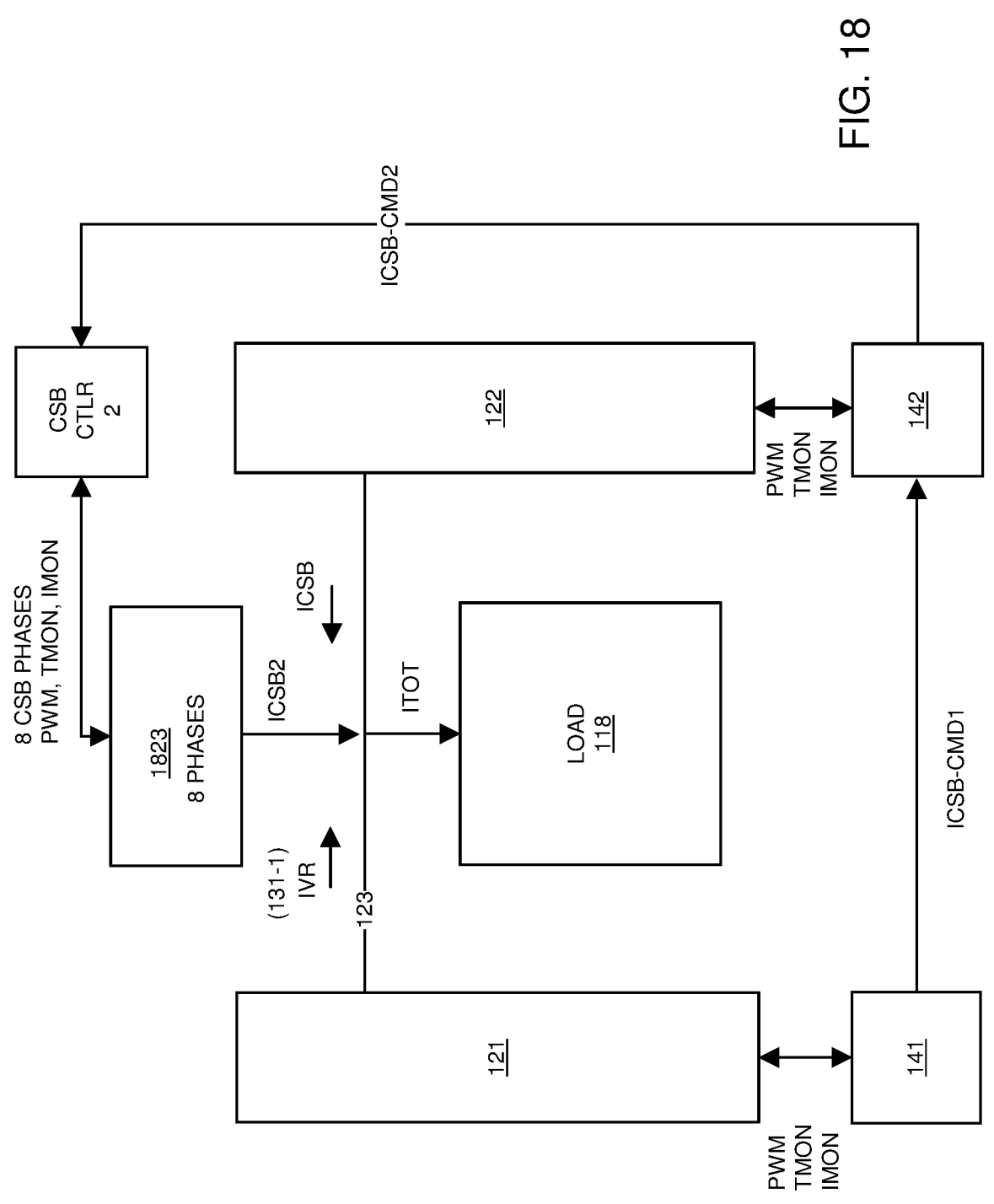
FIG. 18 is an example diagram illustrating apportionment of output current amongst power converters as discussed herein.

FIG. 18 is an example diagram illustrating apportionment of output current amongst power converters as discussed herein.

In this example, the controller 141 generates the control signal ICSB-CMD1 according to dynamic or static behavior as previously discussed.

Power converter 122 such as CSB 1 (such as 16 power converter phases) activates phases to meet current requirements of ICSB-CMD1. The control signal ICSB-CMD2 is generated by controller 142 to control CSB controller 2. The CSB controller 2 is operative to activate one or more phases associated with power converter 1823 (such as 8 phases) to meet current requirements of ICSB-CMD2.

More specifically, control function associated with controller 141 as discussed herein can be configured to: i) regulate a magnitude of the output voltage 123 supplied to the dynamic load 118, and ii) produce a first control signal ICSB-CMD1 indicating a first magnitude of supplemental output current to supply to the dynamic load 118 in addition to output current 131-1 provided by the power converter 121 to the load. A control function associated with the controller 142: i) receives the first control signal ICSB-CMD1, ii) via the second power converter 122, the controller 142 produces the magnitude of the second output current 131-2 to be a first portion of the supplemental output current as indicated by the first control signal ICSB-CMD1, and ii) produces a second control signal (ICSB-CMD2) indicating a second portion of the supplemental output current to supply to the dynamic load 118. The control function (CSB controller 2): i) receives the second control signal ICSB-CMD2, ii) and via a third power converter (8 phases), produces a magnitude of a third output current ICSB2 to be equal to the second portion of the supplemental output current as indicated by the second control signal ICSB-CMD2.

Note that the ICSB-CMD2 can be dynamic or static; and does not have to be the same as ICSB-CMD1. For example, ICSB-CMS1 may be dynamic, ICSB-CMD2 may be static.

However, once a command is static, all remaining downstream commands will be static as well.

In another example with respect to FIG. 18, each CSB controller (such as controller 142, CSB controller 2, etc.) receives a commanded current signal and provides the required amount of current to the dynamic load 118.

When the commanded current exceeds the capability of that respective CSB (power converter), the excess is passed to (commanded from) the subsequent stages. For example, assume that the signal ICSB-CMD1 corresponds to 630 Amps. The controller 142 (such as CSB controller 1) will attempt to meet the demand and activate all 16 phases of power converter 122 to provide 480 A. The command for supplemental current will be passed via ICSB-CMD2 to the CSB controller 2. In this example, the CSB 2 controller will activate, for example, 5 phases to supply the remaining 150 A (remainder of requested current).

Note that many CSBs can be added to the daisy chain. For example, the 24 CSB phases (power converter 122 such as 16 power converter phases and power converter 1823 such as 8 power converter phases) shown as 16+8 can be implemented as 12+12, or 8+8+8, or 6+6+6+6, etc.

Division of phases can be implemented based on cost, layout/routing, thermals, etc.

Figure 19:
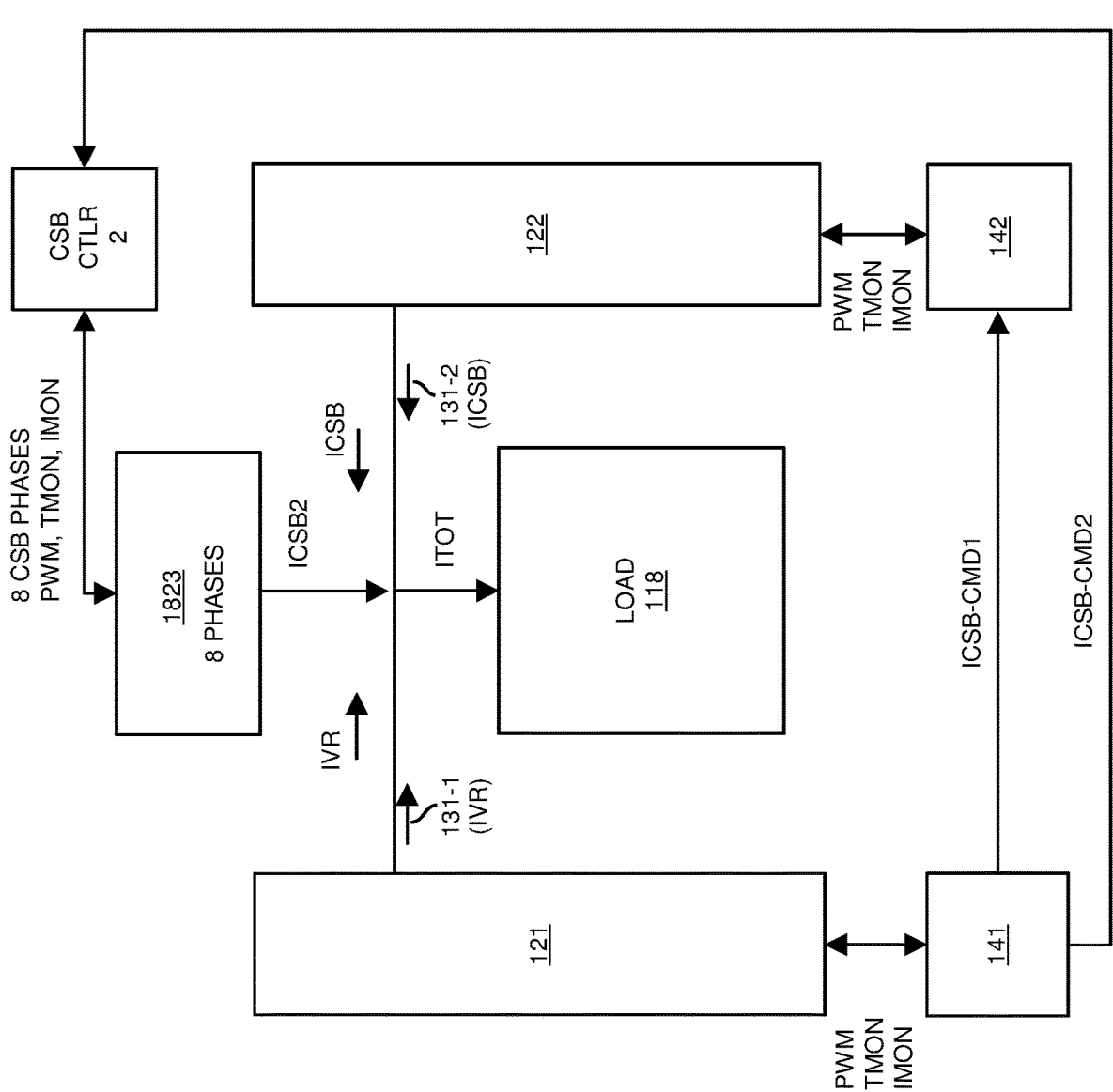
FIG. 19 is an example diagram illustrating apportionment of output current amongst power converters as discussed herein.

FIG. 19 is an example diagram illustrating apportionment of output current amongst power converters as discussed herein.

In this example, the controller 141 generates ICSB-CMD1 and ICSB-CMD2 according to a dynamic behavior of or static behavior as previously discussed.

Note that the commanded CSB current signals can be any combination of static or dynamic. For example, ICSB-CMD1 can be dynamic and ICSB-CMD2 can be static; both control signals can be static, or both can be dynamic.

The choice of static/dynamic is based on desired system behavior.

Each CSB control can be configured to activate phases required to supply commanded current. The controller 141 must know capabilities of each CSB to appropriately scale commanded current.

In this example, a first control function associated with the controller 141: i) regulates a magnitude of an output voltage 123 supplied to the dynamic load 118, ii) produces a first control signal ICSB-CMD1 indicating a first magnitude of supplemental output current to supply to the dynamic load 118, iii) produces a second control signal ICSB-CMD2 indicating a second magnitude of supplemental output current to supply to the dynamic load.

A second control function associated with controller 142: i) receives the first control signal ICSB-CMD1, ii) via the second power converter 122, produces the magnitude of the second output current 131-2 to be equal to the first magnitude of supplemental output current as indicated by the first control signal ICSB-CMD1.

A third control function associated with the CSB controller 2: i) receives the second control signal ICSB-CMD2, ii) produces a magnitude of third output current ICSB2 from a third power converter 1823 (8 phases) to be equal to the second magnitude of supplemental output current ICSB2 as indicated by the second control signal ICSB-CMD2.

In another example of FIG. 19, the controller 141 (a.k.a., VR) can be configured to provide simultaneous commands.

For example, the controller 142 can be configured to control power converter 122 to provide ⅔ of total requested output current ITOTAL while power converter 122 is requested to provide ⅓ of the requested output current.

Note further that the controller 141 can be configured to stagger CSB operation associated with power converters 122 and 1823. For example, the ICSB-CMD1 commands current from CSB1 controller (142) until it reaches its limit (such as ⅔ of max) and then send a command ICSB-CMD2 to control CSB controller 2 to provide extra current via power converter 1823.

The CSB controller 2 and corresponding power converter 1823 such as 8 phases may be only active when the final ⅓ of current is required. i.e. at half-load, VR and CSB 1 will operate while CSB 2 is inactive.

Figure 20:
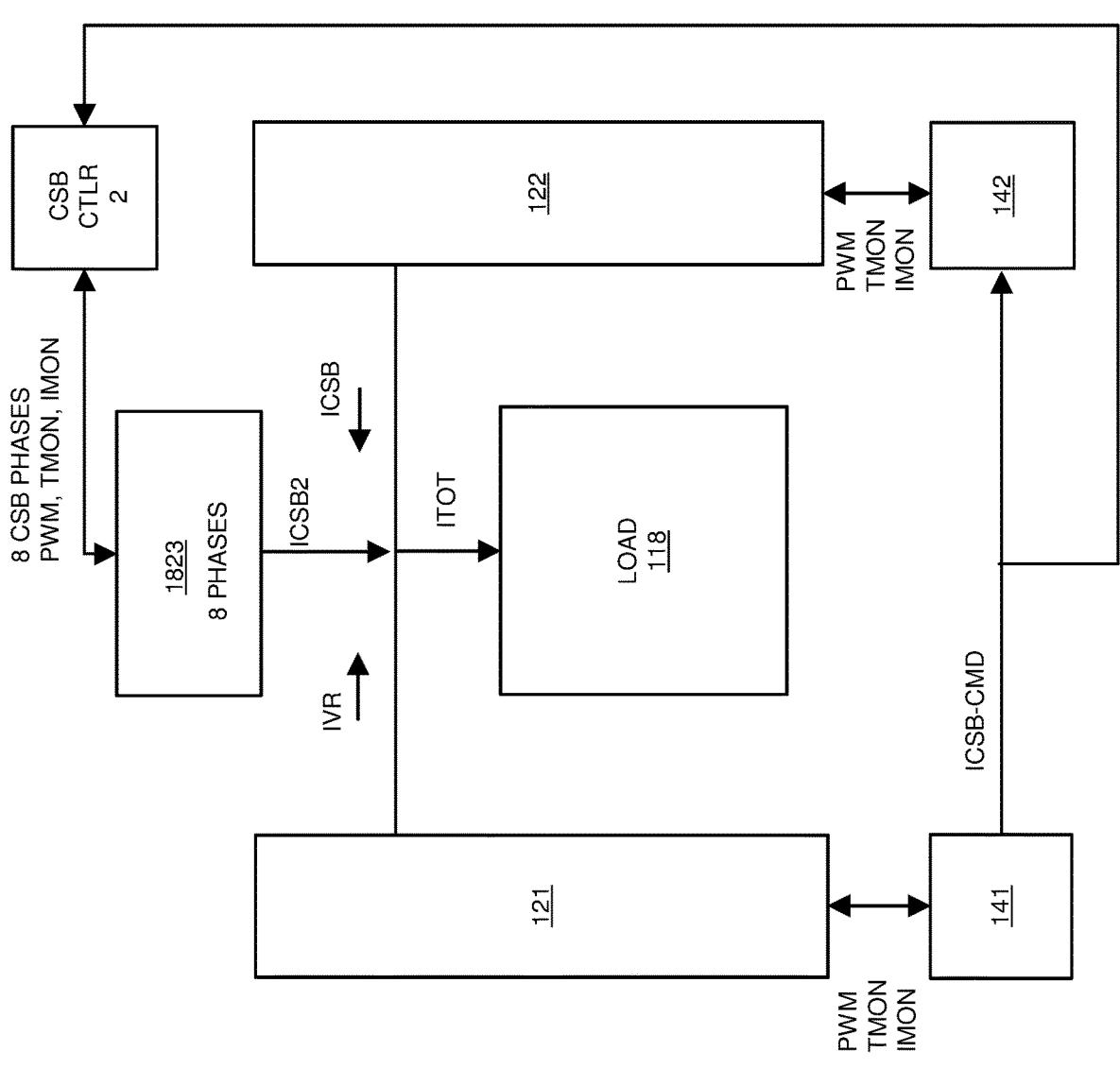
FIG. 20 is an example diagram illustrating apportionment of output current amongst power converters as discussed herein.

FIG. 20 is an example diagram illustrating apportionment of output current amongst power converters as discussed herein.

In this example, the controller 141 generates ICSB-CMD according to dynamic behavior or static behavior as previously discussed. Each CSB controller (such as controller 142 and CSB controller 2) receives the same signal (ICSB-CMD) and scales it according to a pre-programmed factor to controller output current to the dynamic load 118.

Note that the pre-programmed scaling factor is most likely based on CSB phase count; but could include other factors like thermals (in an area of poor cooling); or loss (further from the dynamic load 118 such as xPU; and therefore more conduction loss). Each CSB controller activates its respective phases required to supply commanded current.

In another example, the scaling factor is based on phase count. For example, controller 142 (CSB controller 1) is programmed by system designer to scale ICSB-CMD by ⅔. The CSB controller 2 is programmed to scale by ⅓. Both CSB controllers will be active for all operating points where the VR controller 141 demands current. It is possible for both CSB controllers to be active in PFM (e.g., VR demands 3 Amps-CSB controller 1 provides 2 Amps; CSB controller 2 provides 1 Amp).

Figure 21:
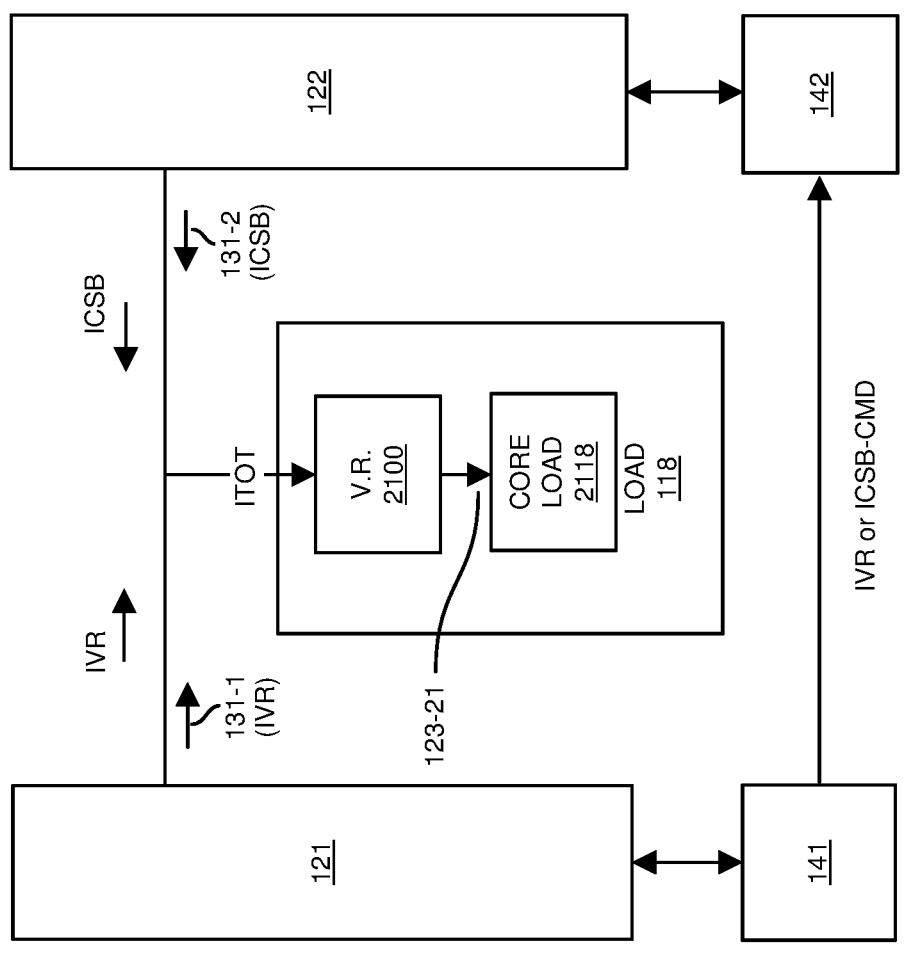
FIG. 21 is an example diagram illustrating apportionment of output current amongst power converters and implementation of an internal voltage regulator in a respective load as discussed herein.

FIG. 21 is an example diagram illustrating apportionment of output current amongst power converters and implementation of an internal voltage regulator in a respective load as discussed herein.

In this example, the controller 141 and power converter 121 (VR) and controller 142 and power converter 122 (CSB) provide input power (via output current 131-1 and output current 131-2) to the voltage regulator 2100 disposed in the dynamic load 118. The voltage regulator 2100 converts the received current ITOTAL (a.k.a., ITOT) into a respective output voltage 123-21 to power the core load 2118. This is a straight-forward extension of other examples as discussed herein.

Figure 22:
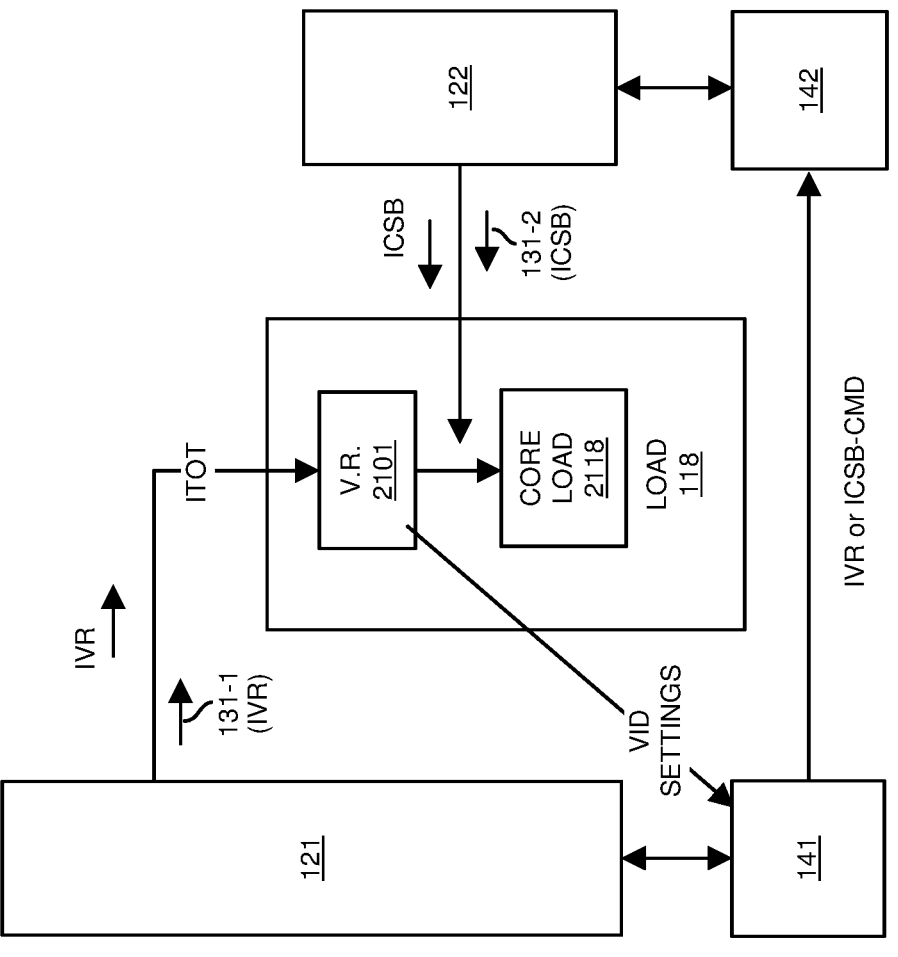
FIG. 22 is an example diagram illustrating apportionment of output current amongst power converters and implementation of an internal voltage regulator in a respective load as discussed herein.

FIG. 22 is an example diagram illustrating apportionment of output current amongst power converters and implementation of an internal voltage regulator in a respective load as discussed herein.

In this example, the VR provides integrated VR input power & CSB boosts integrated VR output power. The VR commands the boost current to reduce the power it must supply to the dynamic load 118. Note that the boost current can be connected to the same node as the VR output, or a downstream node (ex. integrated VR output). As further shown, the integrated voltage regulator 2101 associated with dynamic load 118 can be configured to generate respective VID settings communicated to the controller 141 to control a magnitude of the output voltage 123 supplied to the integrated voltage regulator 2101.

Figure 23:
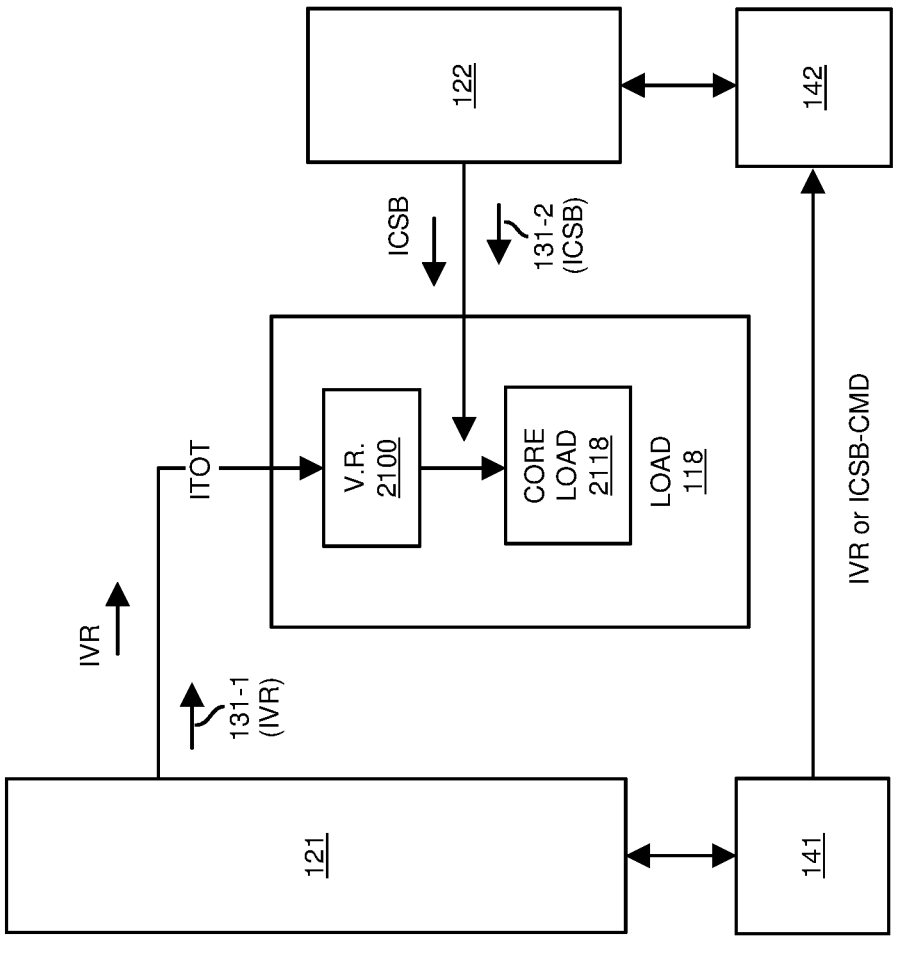
FIG. 23 is an example diagram illustrating apportionment of output current amongst power converters and implementation of an internal voltage regulator in a respective load as discussed herein.

FIG. 23 is an example diagram illustrating apportionment of output current amongst power converters and implementation of an internal voltage regulator in a respective load as discussed herein.

In this example, the integrated voltage regulator system shows a single CSB controller (controller 142) and power stages. However, any example configuration discussed can be applied to an integrated VR system.

Figure 24:
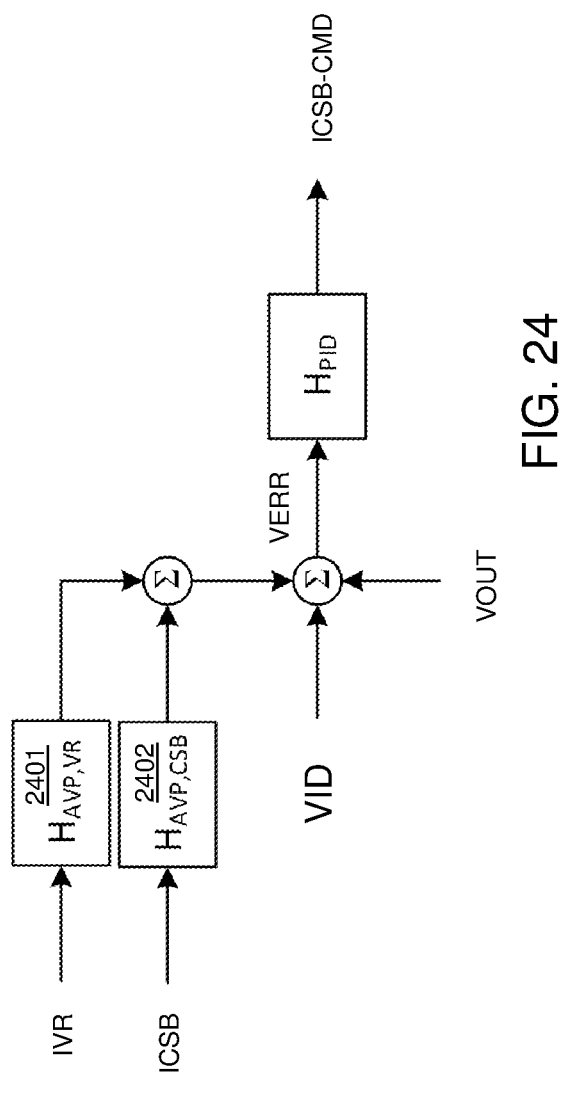
FIG. 24 is an example diagram illustrating implementation of output current apportionment in a dual load-line system as discussed herein.

FIG. 24 is an example diagram illustrating implementation of output current apportionment in a dual load line system as discussed herein.

In this example, the VR and CSB loops can have different load lines and AVP filters as shown. The VR filter 2401 can be tuned to system impedance for optimal performance and capacitor reduction. The CSB filter 2402 can be low frequency; determines steady-state setpoint.

Figure 25:
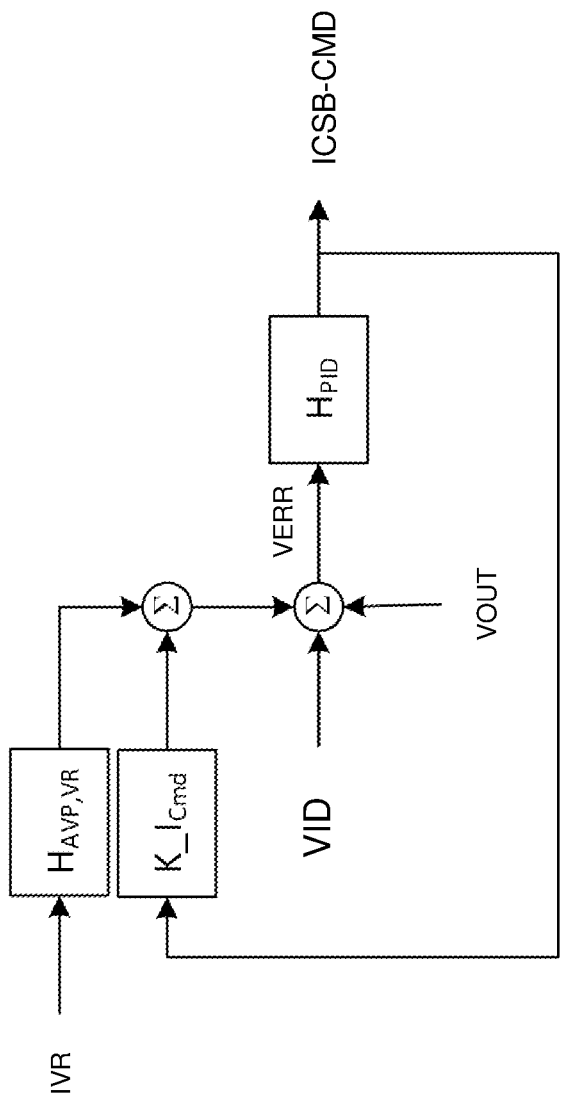
FIG. 25 is an example diagram illustrating a close current control loop based on emulated current for sensor-less adaptive voltage positioning control as discussed herein.

FIG. 25 is an example diagram illustrating a close current control loop based on emulated current for sensor-less adaptive voltage positioning control as discussed herein.

In one embodiment, to save pins and circuit connectivity required to convey the IFDBK signal from the controller 142 to the controller 141, the ICSB-CMD can be fed back to estimate (emulate) output current 131-2 at the controller 141. In other words, the controller 141 can be configured to determine the magnitude of the second output current 131-2 supplied from the second power converter 122 to the load 118 via emulation and signal ICSB-CMD. Thus, the emulation may be based on the output current control setting ICSB-CMD. PID output in average current mode control is commanded current. In VR/CSB, it is commanded total current. This does not affect current of VR or CSB loops, but affects setpoint (low frequency).

Figure 26:
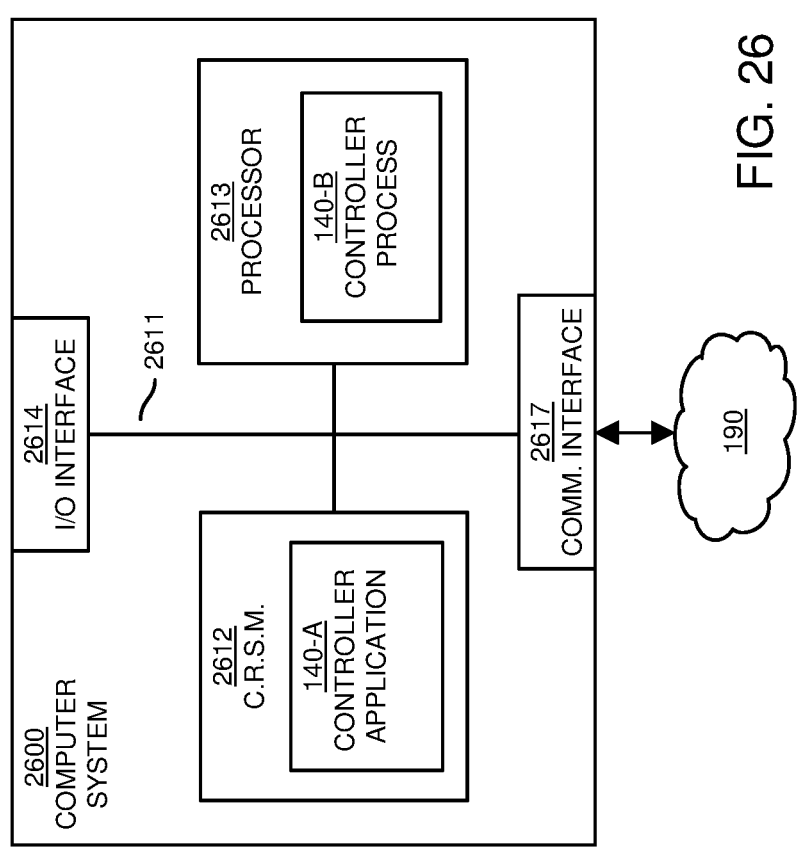
FIG. 26 is an example diagram illustrating computer processor hardware and related software instructions operative to execute methods as discussed herein.

FIG. 26 is an example block diagram of a computer device for implementing any of the operations as discussed herein according to examples herein.

As shown, computer system 2600 (such as implemented by any of one or more resources such as each of controller 141, control 142, etc.) of the present example includes an interconnect 2611 that couples computer readable storage media 2612 such as a non-transitory type of media (or hardware storage media) in which digital information can be stored and retrieved, a processor 2613 (e.g., computer processor hardware such as one or more processor devices), I/O interface 2614 (e.g., to output control signals to the power converter phases, monitor current, etc.), and a communications interface 2617.

I/O interface 2614 provides connectivity to any suitable circuitry such as power converter phases.

Computer readable storage medium 2612 can be any hardware storage resource or device such as memory, optical storage, hard drive, floppy disk, etc. In one example, the computer readable storage medium 2612 stores instructions and/or data used by the controller application 140-A (such as implemented by any of controllers 141, 142, etc.) to perform any of the operations as described herein.

Further in this example, communications interface 2617 enables the computer system 2600 and processor 2613 to communicate over a resource such as network 190 to retrieve information from remote sources and communicate with other computers.

As shown, computer readable storage media 2612 is encoded with controller application 140-A (e.g., software, firmware, etc.) executed by processor 2613. Controller application 140-A can be configured to include instructions to implement any of the operations as discussed herein.

During operation of one example, processor 2613 accesses computer readable storage media 2612 via the use of interconnect 2611 in order to launch, run, execute, interpret or otherwise perform the instructions in controller application 140-A stored on computer readable storage medium 2612.

Execution of the controller application 140-A produces processing functionality such as controller process 140-B in processor 2613. In other words, the controller process 140-B associated with processor 2613 represents one or more aspects of executing controller application 140-A within or upon the processor 2613 in the computer system 2600.

In accordance with different examples, note that computer system 2600 can be a micro-controller device, logic, hardware processor, hybrid analog/digital circuitry, etc., configured to control a power supply and perform any of the operations as described herein.

Functionality supported by the different resources will now be discussed via flowchart in FIG. 27. Note that the steps in the flowcharts below can be executed in any suitable order.

Figure 27:
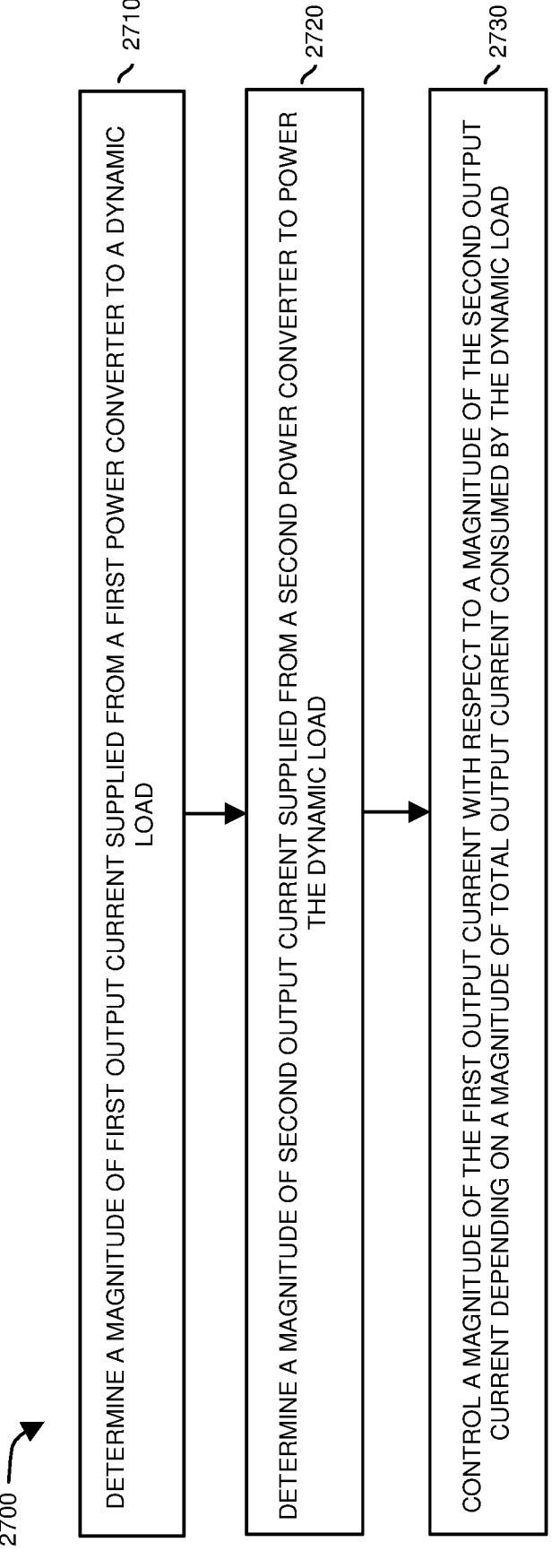
FIG. 27 is an example diagram illustrating a method as discussed herein.

FIG. 27 is an example diagram illustrating a method of controlling a power converter according to examples herein.

In processing operation 2710, the controller 141 and/or corresponding control function 231 determine a magnitude of first output current 131 supplied from a first power converter 121 to a dynamic load 118.

In processing operation 2720, the controller 141 and/or corresponding control function 231 determine a magnitude of second output current 131-2 supplied from a second power converter 122 to power the dynamic load 118.

In processing operation 2730, the controller 141 and corresponding control function 230 control (such as via a ratio as indicated by K) a magnitude of the second output current 131-1 with respect to a magnitude of the first output current 131-2 depending on a magnitude of total output current (ITOTAL) consumed by the dynamic load 118.

Note again that techniques herein are well suited for use in circuit applications such as those implementing power conversion. However, it should be noted that examples herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred examples thereof, it will be understood by those skilled in the art that various changes in form and details may be made therein without departing from the spirit and scope of the present application as defined by the appended claims. Such variations are intended to be covered by the scope of this present application. As such, the foregoing description of examples of the present application is not intended to be limiting. Rather, any limitations to the invention are presented in the following claims.

The invention claimed is:

1. An apparatus comprising:
   a controller operative to:
      determine a magnitude of first output current supplied from a first power converter to a dynamic load;
      determine a magnitude of second output current supplied from a second power converter to power the dynamic load; and
      control a magnitude of the second output current with respect to a magnitude of the first output current depending on a magnitude of total output current consumed by the dynamic load;
      wherein the magnitude of the total output current consumed by the dynamic load increases over time;
      wherein the controller is further operative to increase a percentage of the total output current supplied by the first power converter to the dynamic load during a first condition in which the magnitude of the total output current consumed by the dynamic load increases over time; and
      wherein the controller is further operative to decrease a percentage of the total output current supplied by the second power converter to the dynamic load during the first condition in which the magnitude of the total output current consumed by the dynamic load increases over time.

2. The apparatus as in claim 1, wherein the controller is further operative to:
   via the first power converter, regulate a magnitude of an output voltage of the first power converter with respect to a setpoint reference voltage, the output voltage operative to supply the first output current to the dynamic load.

3. The apparatus as in claim 1, wherein the total output current is determined via summing the magnitude of the first output current and the magnitude of the second output current.

4. The apparatus as in claim 1, wherein the controller is further operative to, over time, vary a ratio of the magnitude of the second output current with respect to the magnitude of the first output current.

5. The apparatus as in claim 1, wherein the controller is further operative to, over time, vary a ratio of the magnitude of the second output current with respect to the magnitude of the first output current in accordance with a control function depending on the total magnitude of a measured signal.

6. The apparatus as in claim 1, wherein the controller is further operative to control output of a control signal to the second power converter, the control signal indicating an output current control setting in which to produce the second output current; and wherein the controller is further operative to determine the magnitude of the second output current supplied from the second power converter via emulation, the emulation based on the output current control setting.

7. The apparatus as in claim 6, wherein the emulation of determining the magnitude of the second output current includes application of a scale factor to the output current control setting.

8. The apparatus as in claim 1, wherein the controller is further operative to:

via a clamp function in a control loop of the second power converter, limit the magnitude of the second output current supplied from the second power converter to the dynamic load.

9. The apparatus as in claim 1, wherein the controller includes:

a first control function operative to: i) regulate a magnitude of an output voltage supplied to the dynamic load, and ii) produce a first control signal indicating a first magnitude of supplemental output current to supply to the dynamic load;

a second control function operative to: i) receive the first control signal, ii) via the second power converter, produce the magnitude of the second output current to be a first portion of the supplemental output current as indicated by the first control signal, and iii) produce a second control signal indicating a second portion of the supplemental output current to supply to the dynamic load; and a third control function operative to: i) receive the second control signal, ii) via a third power converter, produce a magnitude of a third output current to be equal to the second portion of the supplemental output current as indicated by the second control signal.

10. The apparatus as in claim 9, wherein the total number of control functions exceeds 3.

11. The apparatus as in claim 1, wherein the controller includes:

a first control function operative to: i) regulate a magnitude of an output voltage supplied to the dynamic load, ii) produce a first control signal indicating a first magnitude of supplemental output current to supply to the dynamic load, iii) produce a second control signal indicating a second magnitude of supplemental output current to supply to the dynamic load;

a second control function operative to: i) receive the first control signal, ii) via the second power converter, produce the magnitude of the second output current to be equal to the first magnitude of supplemental output current as indicated by the first control signal; and a third control function operative to: i) receive the second control signal, ii) produce a magnitude of third output current from a third power converter to be equal to the second magnitude of supplemental output current as indicated by the second control signal.

12. The apparatus as in claim 11, wherein the total number of control functions exceeds 3.

13. The apparatus as in claim 1, wherein the controller includes:

a first control function operative to: i) regulate a magnitude of an output voltage supplied to the dynamic load, and ii) produce a first control signal indicating a first magnitude of supplemental output current to supply to the dynamic load;

a second control function operative to: i) receive the first control signal, ii) via the second power converter, produce the magnitude of the second output current to be a first portion of the supplemental output current as indicated by the first control signal, and a third control function operative to: i) receive the first control signal, ii) via a third power converter, produce a magnitude of a third output current to be a second portion of the supplemental output current as indicated by the first control signal.

14. The apparatus as in claim 13, wherein the total number of control functions exceeds 3.

15. The apparatus as in claim 1, wherein the first power converter is operative to supply the first output current to an integrated voltage regulator associated with the dynamic load, the integrated voltage regulator operative to convert the first output current into third output current supplied to a core portion of the dynamic load; and wherein the second power converter is operative to supply the second output current to the core portion of the dynamic load.

16. The apparatus as in claim 1, wherein the magnitude of total output current consumed by the dynamic load includes a summation of the magnitude of the first output current and the magnitude of the second output current.

17. The apparatus as in claim 16, wherein the controller is further operative to:

in response to detecting that the magnitude of the total output current consumed by the dynamic load falls within a first range at a first instant of time, control the magnitude of the first output current to be greater than the magnitude of the second output current.

18. The apparatus as in claim 17, wherein the controller is further operative to:

in response to detecting that the magnitude of the total output current consumed by the dynamic load falls within a second range at a second instant of time, control the magnitude of the second output current to be greater than the magnitude of the first output current.

19. The apparatus as in claim 1, wherein the controller is further operative to:

via the first power converter, regulate a magnitude of an output voltage of the first power converter with respect to a setpoint reference voltage, the output voltage operative to supply the first output current to the dynamic load.

20. An apparatus comprising:

a controller operative to:

determine a magnitude of first output current supplied from a first power converter to a dynamic load;

determine a magnitude of second output current supplied from a second power converter to power the dynamic load; and control a magnitude of the second output current with respect to a magnitude of the first output current depending on a magnitude of total output current consumed by the dynamic load;

wherein the controller is further operative to:

receive a first signal indicating the magnitude of the first output current;

receive a second signal indicating the magnitude of the second output current;

sum the first signal and the second signal to produce a third signal indicative of the magnitude of the total output current consumed by the dynamic load;

multiply the first signal by a gain value, K, to produce an output current control signal supplied to the second power converter to control the magnitude of the second output current; and wherein the controller is operative to select the magnitude of the gain value K depending on which of multiple output current ranges the magnitude of the total output current resides.

21. An apparatus comprising:

a controller operative to:

determine a magnitude of first output current supplied from a first power converter to a dynamic load;

determine a magnitude of second output current supplied from a second power converter to power the dynamic load; and control a magnitude of the second output current with respect to a magnitude of the first output current depending on a magnitude of total output current consumed by the dynamic load;

wherein the magnitude of the total output current consumed by the dynamic load decreases over time;

wherein the controller is further operative to decrease a percentage of the total output current supplied by the first power converter to the dynamic load during a condition in which the magnitude of the total output current consumed by the load decreases over time; and wherein the controller is further operative to increase a percentage of the total output current supplied by the second power converter to the dynamic load during the condition in which the magnitude of the total output current consumed by the load decreases over time.

* * * * *